(12) United States Patent
Yoshioka et al.

(10) Patent No.: US 10,181,620 B2
(45) Date of Patent: Jan. 15, 2019

(54) POWER SOURCE UNIT

(71) Applicant: Lithium Energy Japan, Kyoto-shi (JP)

(72) Inventors: Toshiki Yoshioka, Kyoto (JP); Toshiki Kusunoki, Ritto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 547 days.

(21) Appl. No.: 13/740,015

(22) Filed: Jan. 11, 2013

(65) Prior Publication Data

US 2013/0183543 A1 Jul. 18, 2013

(30) Foreign Application Priority Data

Jan. 16, 2012 (JP) .................................. 2012-006617
Dec. 17, 2012 (JP) .................................. 2012-275154

(51) Int. Cl.
*H01M 10/42* (2006.01)
*H01M 2/10* (2006.01)

(52) U.S. Cl.
CPC ..... *H01M 10/4257* (2013.01); *H01M 2/1077* (2013.01); *H01M 2010/4271* (2013.01); *H01M 2220/20* (2013.01)

(58) Field of Classification Search
CPC ............................................... H01M 10/4257
See application file for complete search history.

(56) References Cited

U.S. PATENT DOCUMENTS

| | | | |
|---|---|---|---|
| 2002/0182480 A1* | 12/2002 | Hanauer | H01M 2/1016 429/62 |
| 2007/0026305 A1* | 2/2007 | Jeon et al. | 429/159 |
| 2008/0199765 A1* | 8/2008 | Yoon et al. | 429/91 |
| 2009/0017366 A1 | 1/2009 | Wood et al. | |
| 2009/0142654 A1 | 6/2009 | Fakers et al. | |
| 2009/0305116 A1* | 12/2009 | Yang et al. | 429/61 |
| 2010/0124693 A1* | 5/2010 | Kosugi | H01M 2/043 429/92 |
| 2010/0297482 A1* | 11/2010 | Yoon et al. | 429/61 |
| 2011/0076521 A1 | 3/2011 | Shimizu et al. | |
| 2011/0117409 A1 | 5/2011 | Lee et al. | |
| 2011/0206948 A1 | 8/2011 | Asai et al. | |
| 2011/0294000 A1 | 12/2011 | Kim et al. | |
| 2012/0161677 A1 | 6/2012 | Kunimitsu et al. | |

FOREIGN PATENT DOCUMENTS

| | | |
|---|---|---|
| CN | 201032639 Y | 3/2008 |
| EP | 2 099 085 A2 | 9/2009 |
| EP | 2 413 396 A2 | 2/2012 |

(Continued)

OTHER PUBLICATIONS

Definition_Wall by Merriam-Webster dictionary, Pertinent Pages: p. 1.*

(Continued)

*Primary Examiner* — Sarah A. Slifka
(74) *Attorney, Agent, or Firm* — McGinn I.P. Law Group, PLLC.

(57) ABSTRACT

A power source unit includes a battery main body including at least one battery cell, an electric device located on the battery main body, and a wall located along a lateral side of parts included in the electric device. The wall is taller than a height of the parts.

22 Claims, 33 Drawing Sheets

(56) References Cited

FOREIGN PATENT DOCUMENTS

| | | |
|---|---|---|
| JP | 11-111253 | 4/1999 |
| JP | 2007-329047 | 12/2007 |
| JP | 2008-074027 A | 4/2008 |
| JP | 2008-123927 A | 5/2008 |
| JP | 2008-270121 A | 6/2008 |
| JP | 2008-166545 A | 7/2008 |
| JP | 2009-218011 A | 9/2009 |
| JP | 2009-238606 A | 10/2009 |
| JP | 2011-175743 | 9/2011 |
| JP | 2011-249315 | 12/2011 |
| WO | WO 2011/024477 A1 | 3/2011 |

OTHER PUBLICATIONS

European Search Report dated Jun. 10, 2013.
European Search Report dated Sep. 2, 2016.

* cited by examiner

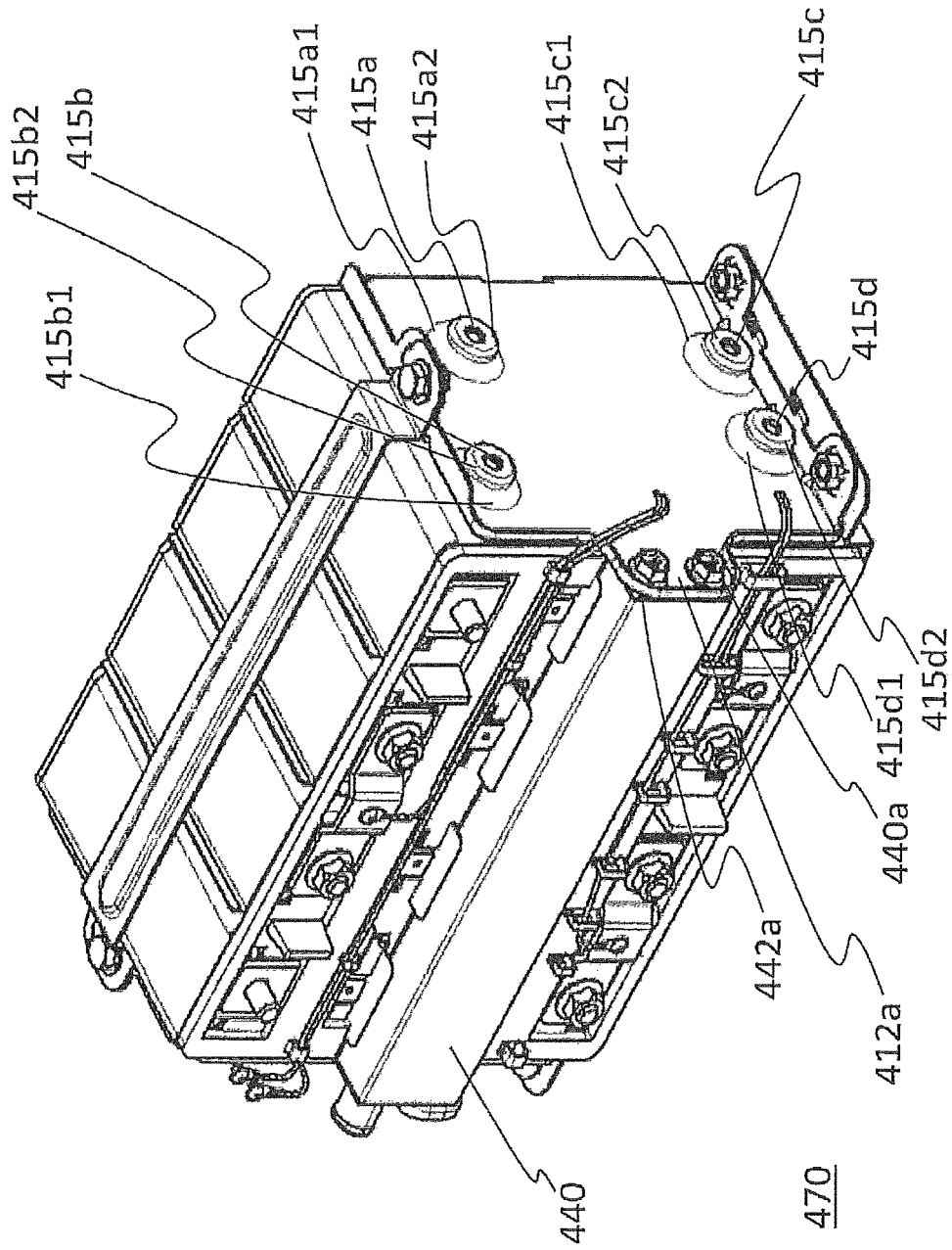

POWER SOURCE UNIT

CROSS REFERENCE TO RELATED APPLICATIONS

The present application is based on and claims priority of Japanese Patent Application No. 2012-006617 filed on Jan. 16, 2012 and Japanese Patent Application No. 2012-275154 filed on Dec. 17, 2012. The entire disclosure of the above-identified applications, including the specification, drawings and claims is incorporated herein by reference in its entirety.

FIELD

The present invention relates to a power source unit including a battery module composed of, for example, a plurality of stacked secondary batteries.

BACKGROUND

Secondary batteries are widely utilized not only as a substitute for a primary battery but also as a power source for electronic apparatuses such as mobile phones and IT devices. In particular, non-aqueous electrolyte secondary batteries, typically exemplified by a lithium ion secondary battery, have been increasingly applied to electric vehicles and large-scale industrial machines, because of the capability of providing high energy density. Further, to obtain an even higher voltage, non-aqueous electrolyte secondary batteries, which are battery cells, are stacked to constitute a battery module.

In the secondary battery, the electrolyte loaded therein is decomposed and vaporizes because of repeated charge and discharge cycles, and hence the casing is swollen and deformed. In order to suppress such deformation of the casing, many of the battery modules including stacked secondary batteries are provided with binding plates located around the stack so as to tightly hold the stack therebetween, for example as disclosed in Patent Literature 1.

In the case of the lithium ion secondary battery, the charging is performed under a low-current constant-voltage control, and therefore a control circuit is provided for controlling the charging and discharging. In power source units having the battery module in particular, the surface of the plate provided on a side face of the stack is utilized for attaching the control circuit (see FIG. 2 in Patent Literature 1).

CITATION LIST

Patent Literature

Japanese Unexamined Patent Application Publication No. 2011-249315

SUMMARY

Technical Problem

With the foregoing configuration of the power source unit, however, electric devices such as the control circuit are prone to be damaged. Accordingly, an object of the present invention is to provide a power source unit capable of protecting the electric devices thereby improving durability.

Solution to Problem

In an aspect, the present invention provides a power source unit including a battery main body including at least one battery cell, an electric device located on the battery main body, and a wall located along a lateral side of parts included in the electric device. The wall is taller than a height of the parts.

With such a configuration of the power source unit, the wall taller than the height of the parts of the electric device is located along the lateral side of the parts, and therefore the parts can be protected by the wall. Even if the electric device is enclosed in a container for protection, the electric device may be damaged when the container is deformed. Even in such a case, the wall serves to protect the electric device. The power source unit thus configured is, therefore, capable of protecting the electric device thereby improving the durability thereof.

The wall may be provided along a peripheral edge of the electric device.

In this case, the wall serves to restrict a foreign matter from intruding into the electric device, thereby protecting the parts in the electric device.

The wall may be formed of an insulative material.

In this case, the wall of an insulative material can insulate the parts in the electric device from peripheral components.

The power source unit may further include a container that accommodates therein the battery main body and the electric device, and a top end portion of the wall is opposed to an inner wall of the container.

In this case, since the top end portion of the wall and the inner wall of the container are opposed to each other, the wall serves as a buffer that prevents the parts in the electric device from directly contacting the inner wall of the container. Accordingly, even if the power source unit vibrates or swings owing to an external force, the top end portion of the wall first collides with the inner wall of the container, thereby protecting the parts.

The container may include a rib formed on an inner wall thereof, the rib extending while being opposed to the wall.

In this case, since the container includes a rib formed on the inner wall so as to extend along the wall, even if the power source unit vibrates or swings owing to an external force, the top end portions of the wall and the rib first collide with other, thereby further ensuring the protection of the parts in the electric device.

The top end portion of the rib may intersect the top end portion of the wall, in a view in a direction in which the rib and the wall are opposed.

Such a configuration facilitates, when the power source unit vibrates or swings owing to an external force, the top end portion of the rib and that of the wall to contact each other, to thereby protect the parts in the electric device.

The container may be formed of a synthetic resin.

Forming the container of a synthetic resin contributes to reducing the weight of the power source unit and improves formability of the outer shape, thereby enabling the power source unit to fit the existing standards of storage batteries.

The battery main body may include a stack composed of a plurality of battery cells aligned, and holding plates respectively provided on side faces of the stack for holding the stack, and the electric device may be located on at least one of the holding plates.

Fixing the electric device on the holding plates, which hold the stack therebetween from the both side faces of the stack, facilitates the electric device to be located on the battery main body.

BRIEF DESCRIPTION OF DRAWINGS

These and other objects, advantages and features of the invention will become apparent from the following description thereof taken in conjunction with the accompanying drawings that illustrate a specific embodiment of the present invention.

FIG. 16 is a perspective view showing the configuration of the battery module according to the embodiment.

DESCRIPTION OF EMBODIMENT

Figure 1:
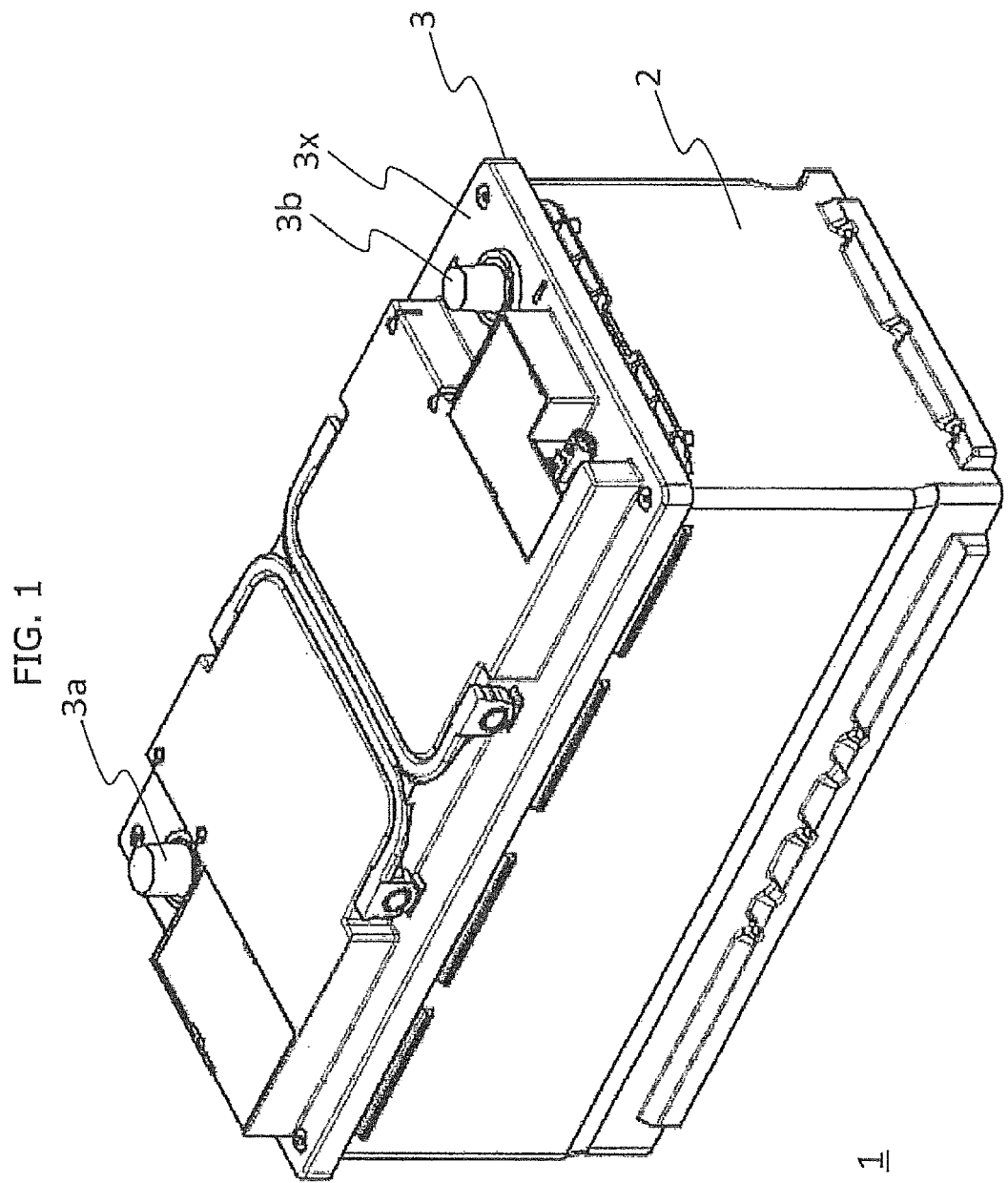
FIG. 1 is a perspective view showing a power source unit according to an embodiment of the present invention.

The conventional techniques described above have the following drawback.

In the control circuit of the conventional power source unit, the elements which are the parts constituting the control circuit are exposed through the side face of the stack, inside the container. Accordingly, in the case where the container is broken owing to vibration or impact from outside, the control circuit is directly affected by the incident. In addition, the control circuit is normally exposed when being attached to the side face of the stack in the manufacturing process of the battery module, and therefore the control circuit may be damaged depending on the handling of the control circuit in the manufacturing site.

The present invention has been accomplished in view of the foregoing problem, and provides a power source unit with a battery, configured to properly protect electric devices such as a circuit for managing charge and discharge performance, and to improve the durability of the battery.

Hereafter, an embodiment of the present invention will be described referring to the drawings. The embodiment described below represents a preferable example of the present invention. Numerical values, shapes, materials, constituents, positions thereof and relationship therebetween, methods, and sequences thereof cited in the following embodiment are only exemplary, and in no way intended to limit the present invention. The constituents described in the embodiment but not set forth in independent claims representing the most superordinate concept of the present invention are to be construed as optional constituents that may achieve a more preferable form.

[General Configuration of Power Source Unit]

Figure 2:
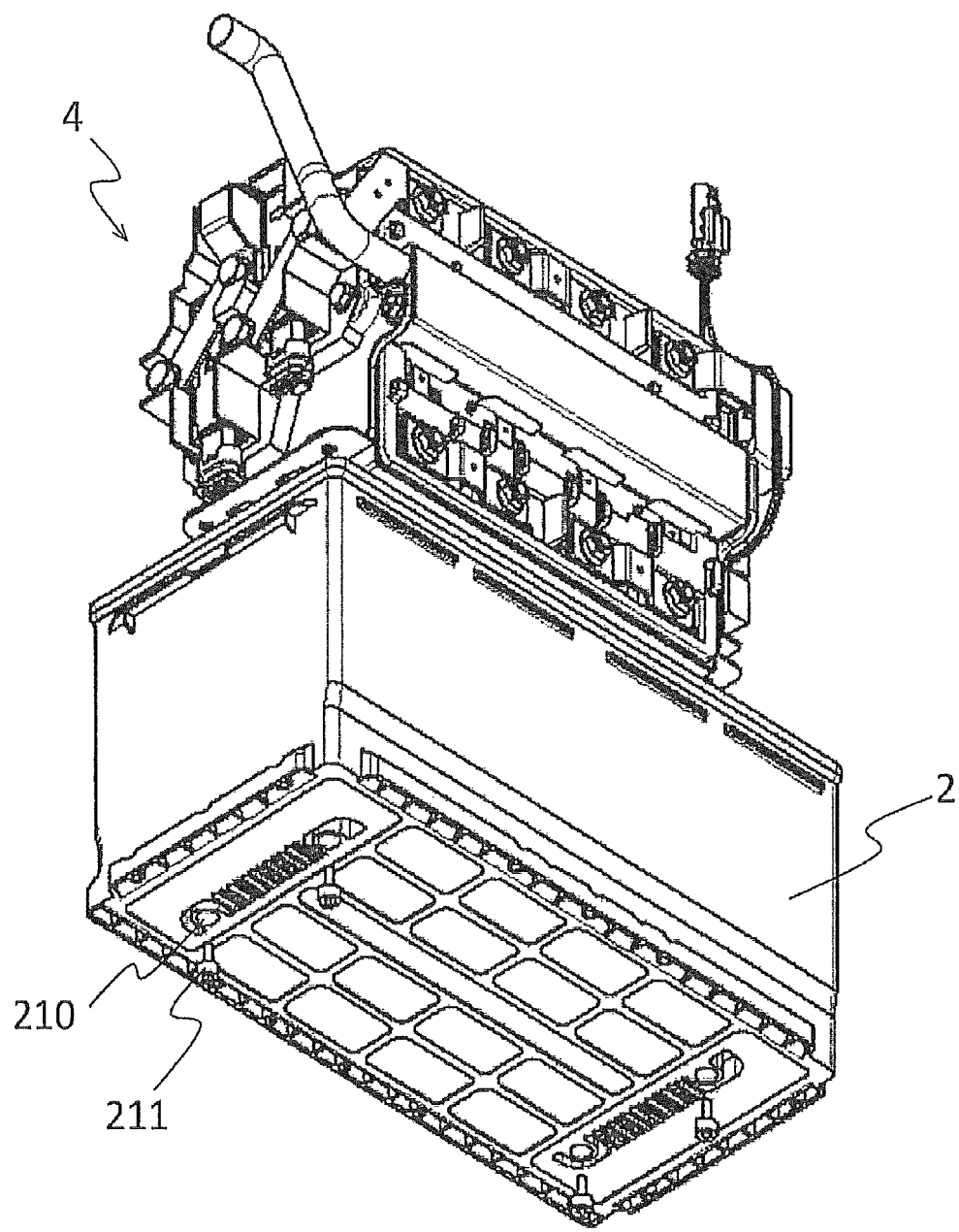
FIG. 2 is a perspective view explaining the configuration of the power source unit according to the embodiment.

FIG. 1 is a perspective view showing a configuration of a power source unit 1 according to this embodiment, and FIG. 2 is a perspective view showing an internal structure of the power source unit 1.

The power source unit 1 has, as shown in FIG. 1, a container of a hexahedral outer shape composed of a container body 2 and a cover 3 formed of a synthetic resin such as polypropylene. The power source unit 1 also includes a positive terminal 3a and a negative terminal 3b exposed on an upper face 3x of the cover 3, for connection with an external load (not shown). In addition, the power source unit 1 includes a power source main body 4, enclosed inside the container and fixed to the container body 2 with screws 211 each inserted through one of through holes 210 formed on the bottom face of the container body 2.

Figure 3:
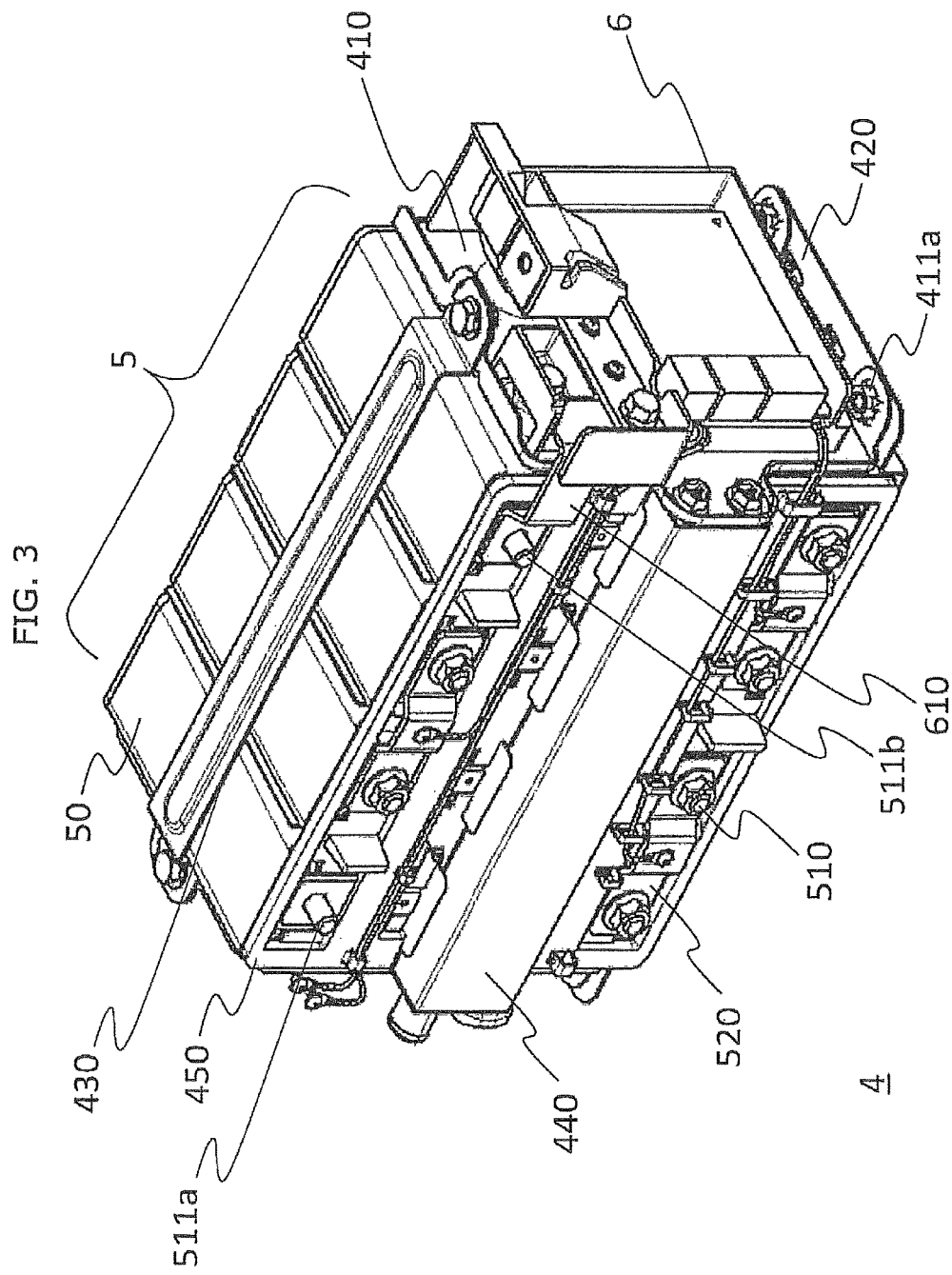
FIG. 3 is a perspective view showing the configuration of the power source unit according to the embodiment.
Figure 4:
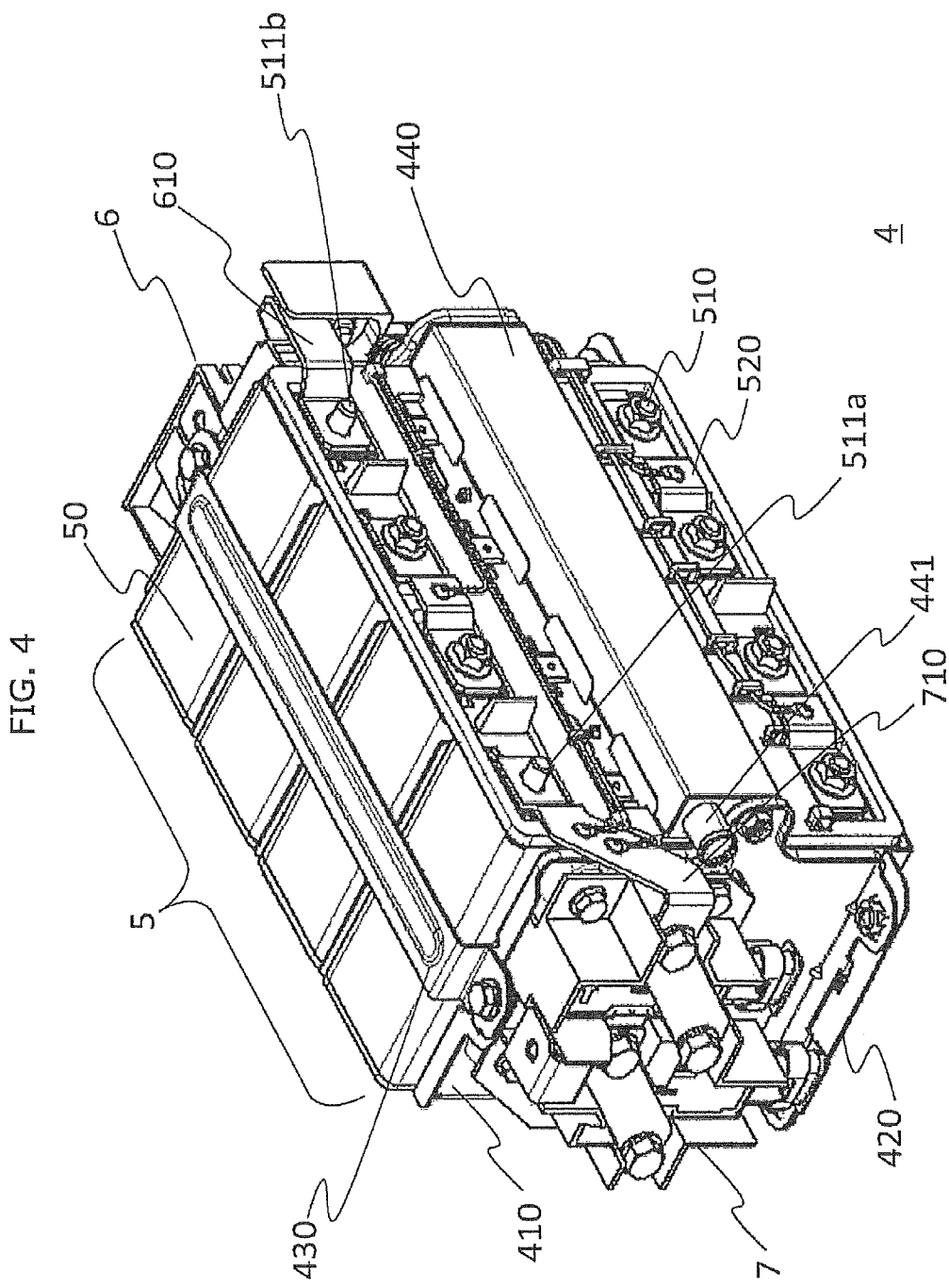
FIG. 4 is another perspective view showing the configuration of the power source unit according to the embodiment.
Figure 5:
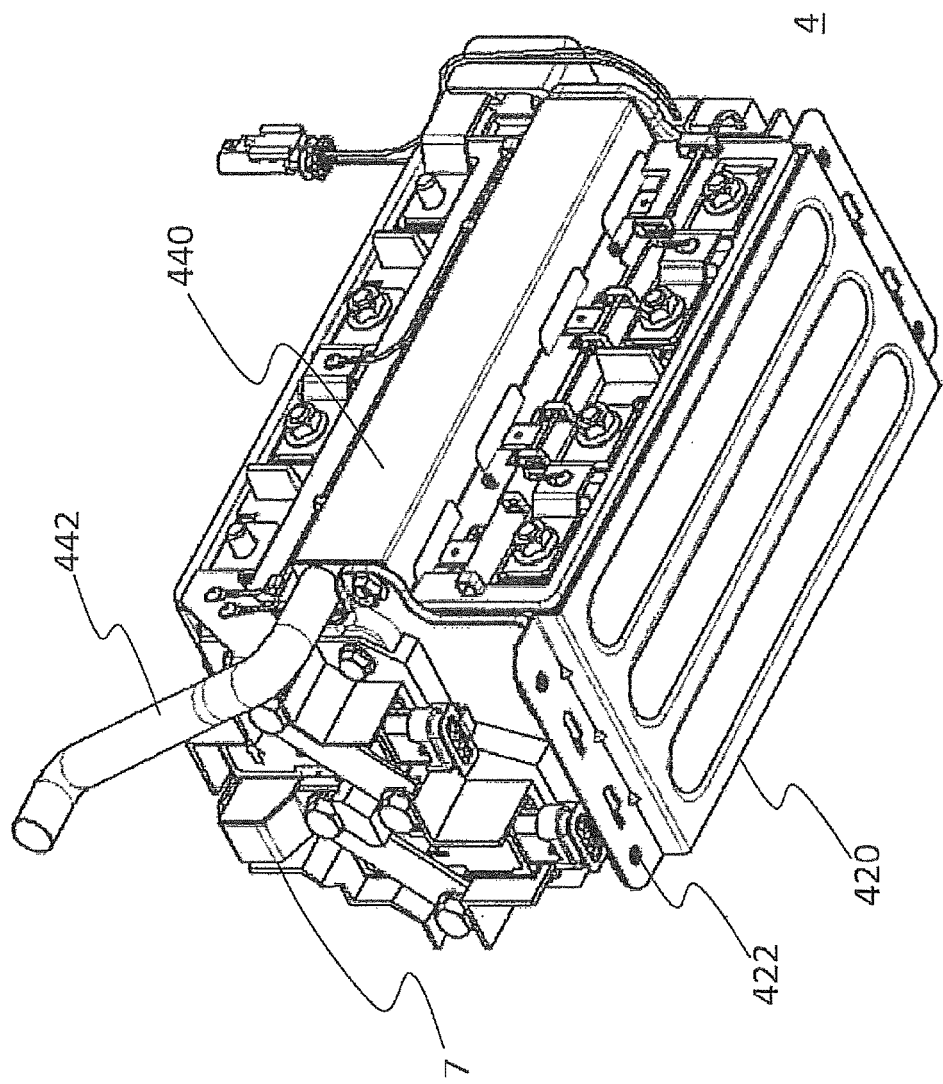
FIG. 5 is still another perspective view showing the configuration of the power source unit according to the embodiment.

FIG. 3 is a perspective view from the right of the power source main body 4 according to this embodiment, and FIG. 4 is a perspective view from the left of the power source main body 4. FIG. 5 is a perspective view from the bottom of the power source main body 4. Here, the face of the power source main body 4, on which an electrode terminal to be described later is located, will be referred to as the front face.

As shown in FIGS. 3 and 4, the power source main body 4 includes a stack 5 composed of a plurality of battery cells 50 aligned such that the respective faces having a positive or negative electrode terminal 510 are oriented in the same direction, a control circuit 6 that controls the charge and discharge of the power source main body 4, and a relay circuit 7 that controls the switching of the charge and discharge of the power source main body 4.

At least one of the battery cells 50 includes an opposing face opposed to a coupling member 440 to be described later, and the electrode terminal 510 located on the opposing face. In this embodiment, all the battery cells 50 have the electrode terminal 510 provided on the opposing face.

The battery cells 50 each include a metal outer jacket of a rectangular column shape having the opposing face, on which the electrode terminal 510 is provided, and the face opposite thereto, which will be referred to as the top face and the bottom face, respectively. In each of the battery cells 50 a largest one of the side faces will be referred to as main surface (main surface 53 in FIGS. 10A and 10B). The stack 5 is composed of four battery cells 50 aligned in a single row, with the respective main surfaces thereof opposed to each other.

In the stack 5, the battery cells 50 are each turned side face up, such that the top face of the battery cell 50 corresponds to the front face of the stack 5; the front and rear faces, i.e., the main surfaces of the battery cell 50 (faces along the long sides) correspond to the left and right side faces of the stack 5; and the left and right faces of the battery cells 50 (faces along the short sides) correspond to the top face and the bottom face of the stack 5, respectively. In other words, the face opposing the coupling member 440 is the top face of the battery cell 50, and corresponds to the front face of the stack 5.

Among the battery cells 50 constituting the stack 5, the electrode terminal 510 of one of the battery cells 50 is connected to the electrode terminal of the opposite polarity of another battery cell 50, via a bus bar 520 made of a conductive metal such as copper, aluminum, an alloy thereof, or the like. By means of the bus bars 520 the battery cells 50 are serially connected, so that the stack 5 constitutes a high-voltage battery as a whole. Of the electrode terminals 510 of the battery cells 50 located on the left and right end of the stack 5, the ones not connected to the bus bar 520 serve as a positive electrode terminal 511a and a negative electrode terminal 511b of the stack 5.

The alignment of the battery cells 50 in the stack 5 is maintained by a binding mechanism. As shown in FIGS. 3 and 4, the binding mechanism includes a battery module frame 410, a second beam member 420, a third beam member 430, and the coupling members 440.

The battery module frame 410 includes a pair of holding plates opposed to the main surfaces of the outermost ones of the row of the battery cells 50. The second beam member 420 is opposed to the bottom face of the stack 5, and the third beam member 430 is opposed to the top face of the stack 5. The coupling members 440 are each opposed to the front face of the stack 5, extending between the holding plates of the battery module frame 410.

The holding plates of the battery module frame 410 are connected to the second beam member 420 via the respective lower end portions as shown in FIG. 5, and connected to the third beam member 430 via the respective upper end portions, as shown in FIGS. 3 and 4. The second beam member 420 includes through holes 422 formed on the respective end portions, so that the screws 211 shown in FIG. 2 are fixed to the second beam member 420 via the through holes 422.

Further, the holding plates of the battery module frame 410 are connected to a first beam member via the respective side edges, on the back of the stack 5 though not visibly shown. Further details of the battery module frame 410 including the first beam member will be described later.

The control circuit 6 and the relay circuit 7 constitute a management circuit that controls the charge and discharge performance of a battery module 470 to be described later, which constitutes the battery main body of the power source unit 1. In other words, the management circuit corresponds to the electric device that allows the battery module 470 to be charged and discharged, and is located on the battery module 470.

More specifically, as shown in FIG. 3, the control circuit 6 is located on the right-hand side face of the power source main body 4, and electrically connected to the electrode terminal 511b of the negative electrode of the stack 5, via a joint member 610. The relay circuit 7 is, as shown in FIG. 4, located on the left-hand side face of the power source main body 4, and electrically connected to the electrode terminal 511a of the positive electrode of the stack 5, via a joint member 710.

In addition, as shown in FIGS. 4 and 5, the coupling member 440 includes an outlet port 441 formed on the left end portion, and a drain pipe 442 made of a synthetic resin is connected to the outlet port 441. The outlet port 441 and the drain pipe 442 will be described later in further details.

Thus, in the power source unit 1, the outer shape of the stack 5 is maintained by the binding mechanism in the power source main body 4. Accordingly, the container composed of the container body 2 and the cover 3 need not have the mechanical strength necessary for maintaining the shape of the stack 5. Therefore, a synthetic resin may be employed to form the container body, so that the weight of the power source unit can be reduced.

Further, the outer shape of the container body formed of a synthetic resin can be easily formed, which enables the power source unit to fit the existing standards of the battery. In particular, forming the container body in the same shape as a casing of a lead storage battery, which has conventionally been formed of a synthetic resin, allows the existing lead storage battery to be replaced with the power source unit 1 according to this embodiment, thereby easily making up a lead-free automotive battery. The storage battery may be designed in compliance with JIS and the standards of various countries. In particular, designing the storage battery in compliance with the German industrial standard (DIN) allows the storage battery to be made suitable for use as automotive battery.

Hereunder, the foregoing constituents of the power source unit 1 will be described along the assembly process of the power source unit 1.

[Configuration of Battery Module Holder]

First, description will be given on the battery module holder that holds the battery module in the power source main body 4 of the power source unit 1.

Figure 6:
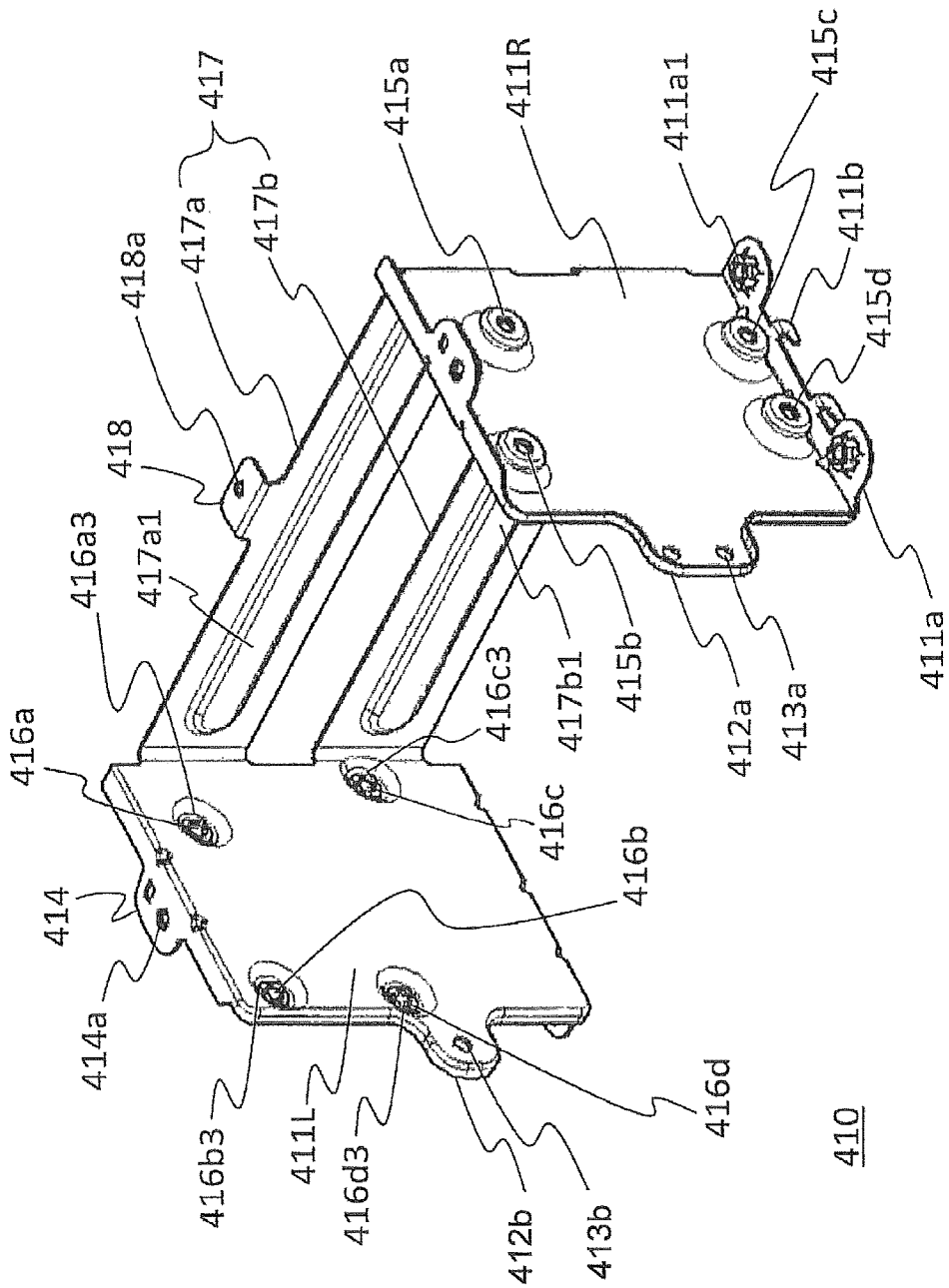
FIG. 6 is a perspective view showing a configuration of a battery module holder according to the embodiment.
Figure 7:
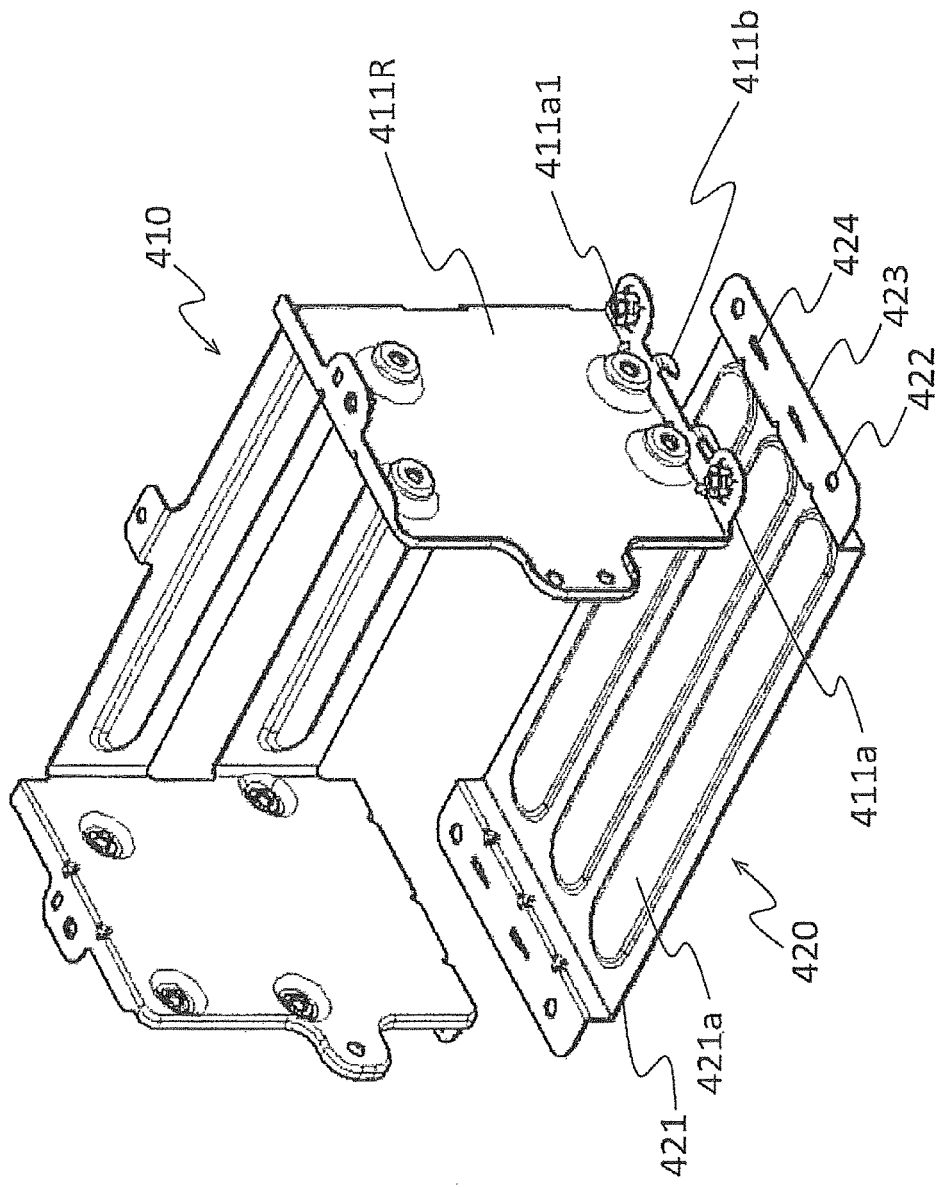
FIG. 7 is an exploded perspective view showing the configuration of the battery module holder according to the embodiment.
Figure 8:
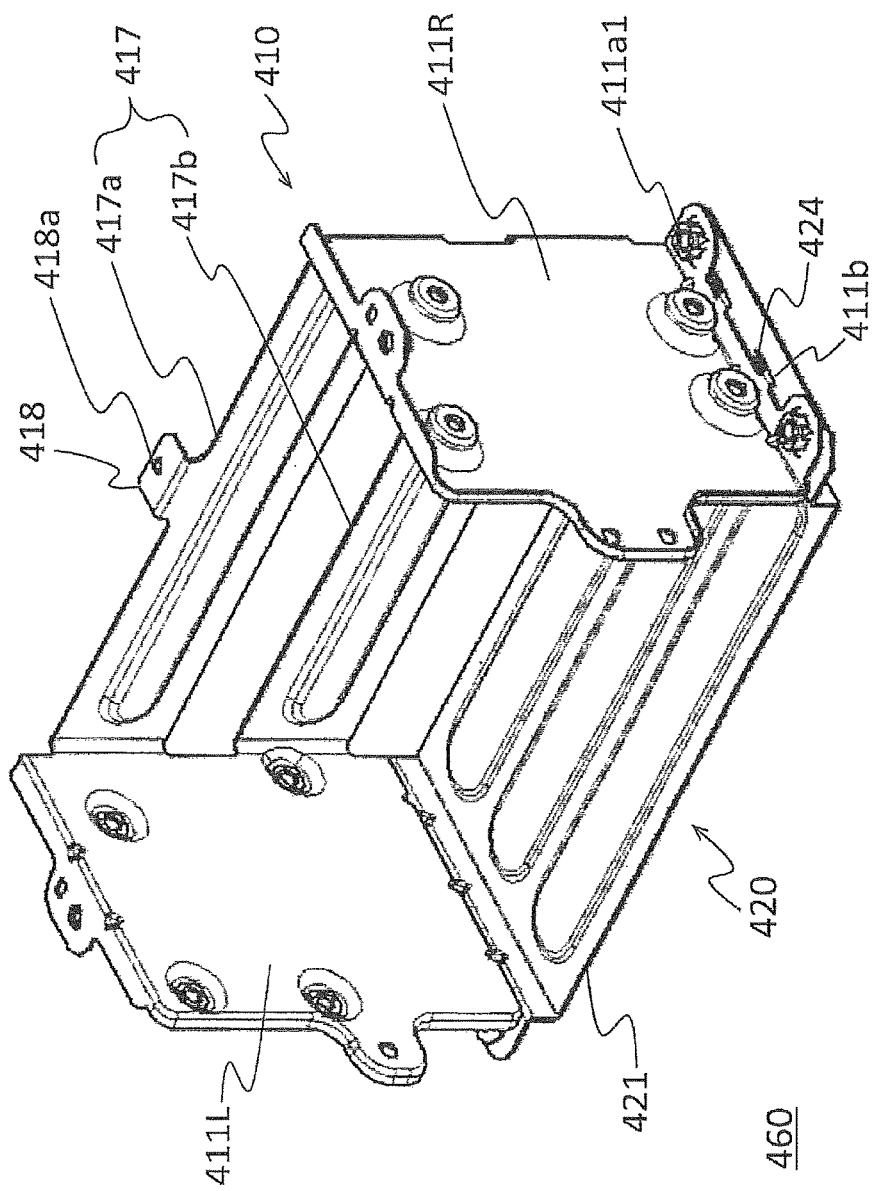
FIG. 8 is another perspective view showing the configuration of the battery module holder according to the embodiment.

FIG. 6 is a perspective view showing a configuration of the battery module frame 410 according to this embodiment. FIGS. 7 and 8 are perspective views showing configurations of the battery module frame 410 and the second beam member 420 according to this embodiment.

As shown in FIG. 6, the battery module frame 410 is a C-shaped member when viewed from the top and includes, as described above, the holding plates 411R, 411L, each having a rectangular shape and opposing each other, and the first beam member 417 connected to the respective side edges of the holding plates 411R, 411L.

The holding plates 411R, 411L and the first beam member 417 are portions of a single piece of bent metal plate. In other words, the battery module frame 410 is formed by stamping a sheet of steel plate, so that the holding plates 411R, 411L and the first beam member 417 are formed as portions of a steel plate bent at the right angle.

Each of the portions will be described here. The holding plate 411R includes a tab 414 disposed at the upper edge of the holding plate 411R, which corresponds to the top face of the power source main body 4, and projecting parallel to the top face. The tab 41 includes through holes 414a formed therethrough.

The holding plate 411R also includes a tab 411a disposed at the lower edge of the holding plate 411R, which corresponds to the bottom face of the power source main body 4, and projecting parallel to the bottom face. A nut 411a1 communicating with the through hole 422 shown in FIG. 5 is fixed to the tab 411a. In addition, the holding plate 411R includes hooks 411b extending from the tab 411a downward with respect to the power source main body 4. The holding plate 411L similarly includes the tabs 414, 411a, and the hook 411b.

In addition, the holding plate 411R includes a tab 412a projecting from the side edge, which corresponds to the front face of the power source main body 4, and the tab 412a includes a pair of vertically aligned through holes 413a. The holding plate 411L also includes a tab 412b formed on the side edge thereof so as to straightly oppose the tab 412a, and the tab 412b includes a through hole 413b. Here, the tab 412a is larger in area than the tab 412b, and hence the tab 412b opposes only a part of the tab 412a.

Further, the holding plate 411R includes through holes 415a, 415b formed on the main surface thereof at positions close to the upper edge corresponding to the top face of the power source main body 4, and through holes 415c, 415d formed on the main surface thereof at positions close to the lower edge corresponding to the bottom face of the power source main body 4. The through holes 415b, 415d are located closer to the front face of the power source main body 4, and the through hole 415a, 415c are located closer to the rear face of the power source main body 4.

Likewise, holding plate 411L includes through holes 416a, 416b formed on the main surface thereof at positions close to the upper edge corresponding to the top face of the power source main body 4. In addition, the holding plate 411L includes a through hole 416d formed on the main surface thereof at a position close to the tab 412b, and a through hole 416c formed on the main surface at a position close to the base portion of the first beam member 417.

The first beam member 417 includes a plate-shaped beam member 417a corresponding to an upper portion of the power source main body 4, and a plate-shaped beam member 417b corresponding to a lower portion of the power source main body 4. The beam members 417a, 417b each include an elliptical protruding portion 417a1, 417b1 extending in the longitudinal direction of the beam members 417a, 417b. Here, the protruding portions 417a1, 417b1 are formed by stamping the steel plate, and hence the back surfaces of the beam members 417a, 417b are recessed, as the reversal shape of the protrusion.

The first beam member 417 also includes a tab 418 projecting parallel to the top face of the stack 5 from the central portion of the beam member 417a, and the tab 418 includes a through hole 418a formed therethrough.

The battery module frame 410 thus configured is, as shown in FIG. 7, coupled with the second beam member 420, on the side of the bottom face of the stack 5.

The second beam member 420 includes a tab 423 formed on each of the end portions thereof so as to oppose the tab 411a of the battery module frame 410. The aforementioned through holes 422 communicating with the nut 411a1 are formed in the tab 423. The tab 423 also includes slits 424 formed at positions corresponding to the hook 411b of the battery module frame 410.

The second beam member 420 also includes elliptical recessed portions 421a formed on the main surface 421, in parallel to the protruding portions 417a1, 417b1 of the first beam member 417. The recessed portion 421a is also formed by stamping the steel plate, and hence the back surface of the second beam member 420 includes protruding portions, as the reversal shape of the recessed portions.

The battery module frame 410 and the second beam member 420 are coupled as follows. The hook 411b of the battery module frame 410 is inserted through the slit 424 of the second beam member 420, and the nut 411a1 and the through hole 422 are made to meet by sliding the tab 411a and the tab 423 with respect to each other. At this point, the hook 411b is fitted in the slit 424 and the coupling of the battery module frame 410 and the second beam member 420 is completed.

Here, the first beam member 417 and the second beam member 420 adjacent to each other define the right angle. As shown in FIG. 8, a battery module holder 460 composed of the battery module frame 410 and the second beam member 420 includes an inner wall including the holding plates 411R, 411L, the first beam member 417, and the main surface 421 of the second beam member 420. Since the first beam member 417 and the second beam member 420 are connected to holding plates 411R, 411L adjacent thereto via the respective side edges, a hexahedral basket shape is obtained in which two adjacent sides are open.

Figure 9:
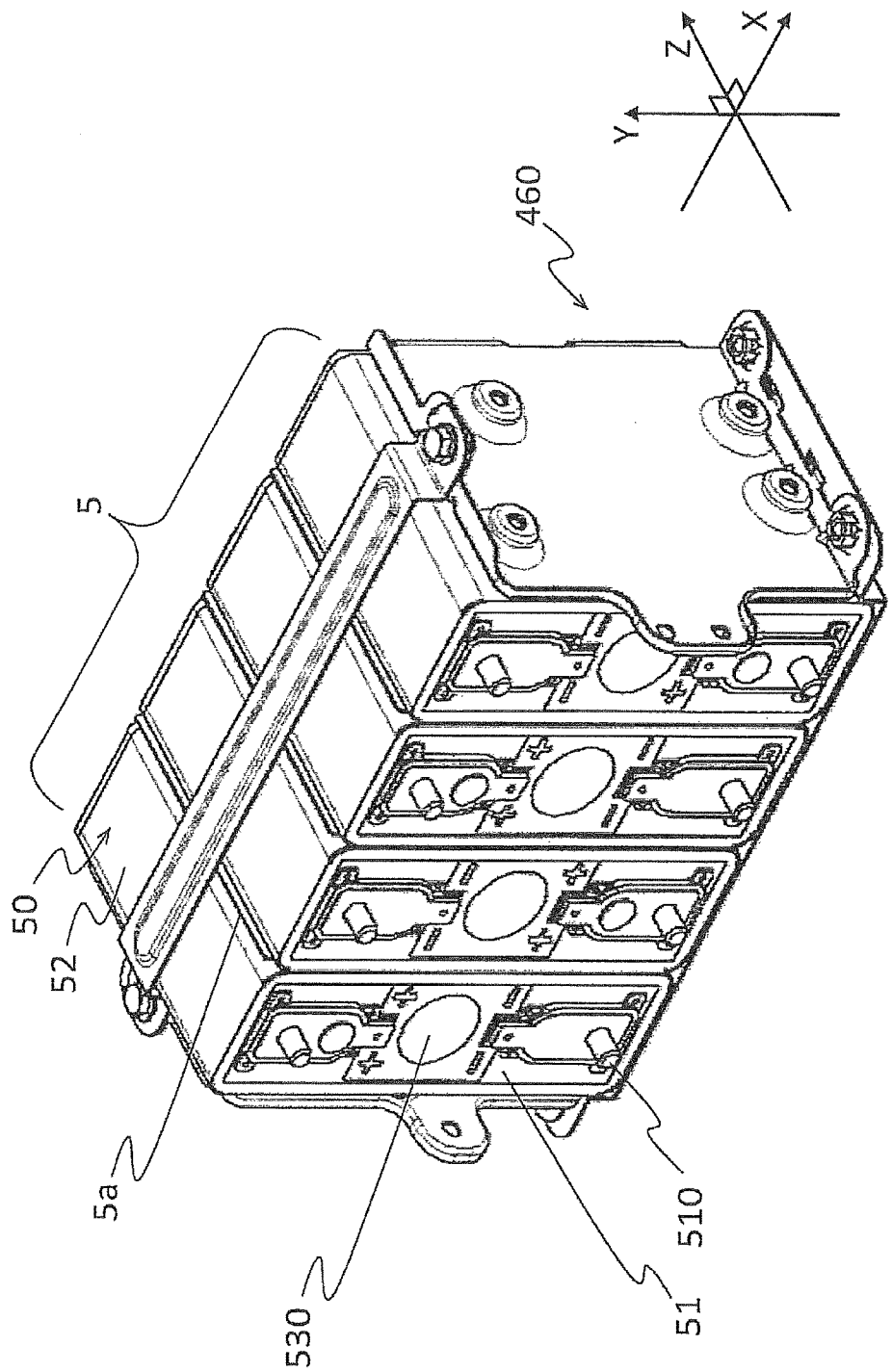
FIG. 9 is a perspective view explaining the battery module holder according to the embodiment.

Upon placing the battery cells 50 along the inner wall of the battery module holder 460, the stack 5 is obtained as shown in FIG. 9. On the top faces 51 of the battery cells 50 constituting the front face of the stack 5, safety valves 530 are provided, in addition to the positive and negative electrode terminals 510, between the electrode terminals 510 of each battery cell 50. FIG. 9 is a perspective view showing a configuration of the battery module holder 460 according to this embodiment.

Figure 10A:
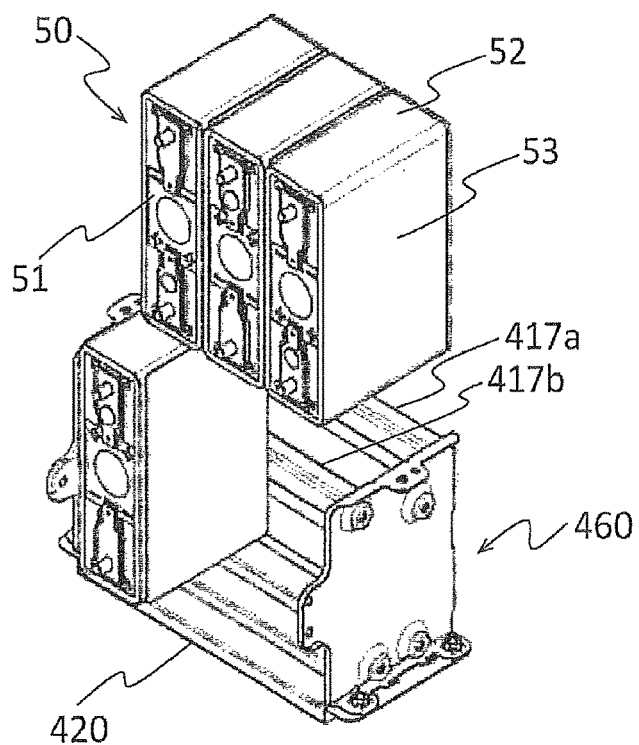
FIG. 10A is another perspective view explaining the battery module holder according to the embodiment.
Figure 10B:
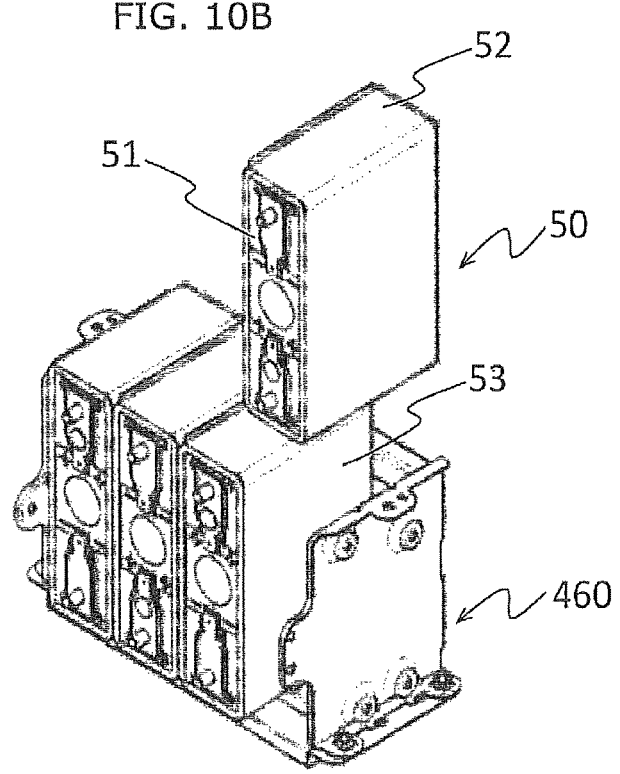
FIG. 10B is still another perspective view explaining the battery module holder according to the embodiment.

FIGS. 10A and 10B illustrate how the battery cells 50 are placed in the battery module holder 460. FIGS. 10A and 10B are perspective views each showing the battery cells 50 placed in the battery module holder 460 according to this embodiment.

As shown in FIG. 10A, the battery cell 50 is placed in the battery module holder 460 with one of the side faces 52 opposed to the second beam member 420 and the bottom face opposed to the first beam member 417. Thus, the top face 51 on which the electrode terminals 510 are provided is exposed as a whole to constitute the side face of the stack 5, and the other side face 52 is exposed to constitute the top face of the stack 5.

Referring again to FIG. 9, when the battery cells 50 are placed in a row in the battery module holder 460, the holding plates 411R, 411L are provided in a direction in which the battery cells 50 are stacked (X-axis direction in FIG. 9). In addition, the second beam member 420 is provided on the lower side (minus side in Y-axis direction) and the first beam member 417 is provided on the back in the depth direction (plus side in Z-axis direction).

Accordingly, the movement and posture of the battery cells 50 are restricted in all of the three directions orthogonal to one another in the space, by the holding plates 411R, 411L, the first beam member 417, and the second beam member 420. Therefore, simply setting the clearance between the holding plates 411R, 411L according to the size and the number of battery cells 50 to be placed allows the battery module holder 460 to easily hold the battery cells 50 temporarily, thereby simplifying the assembly process of the stack 5.

Further, a buffer member 5a made of an elastic material such as silicone rubber is inserted between the battery cells 50 constituting the stack 5, to exempt the battery cells 50 from suffering excessive stress when the battery cells 50 are bound as will be described later. Here, the buffer member 5a can also be used to adjust the width of the stack 5, by employing the buffer members of different thicknesses or inserting a different number of buffer members. Accordingly, the buffer members 5a can absorb the size tolerance and error of the battery module holder 460 or the battery cells 50, to thereby allow the stack 5 to be stably held by the battery module holder 460.

Figure 11:
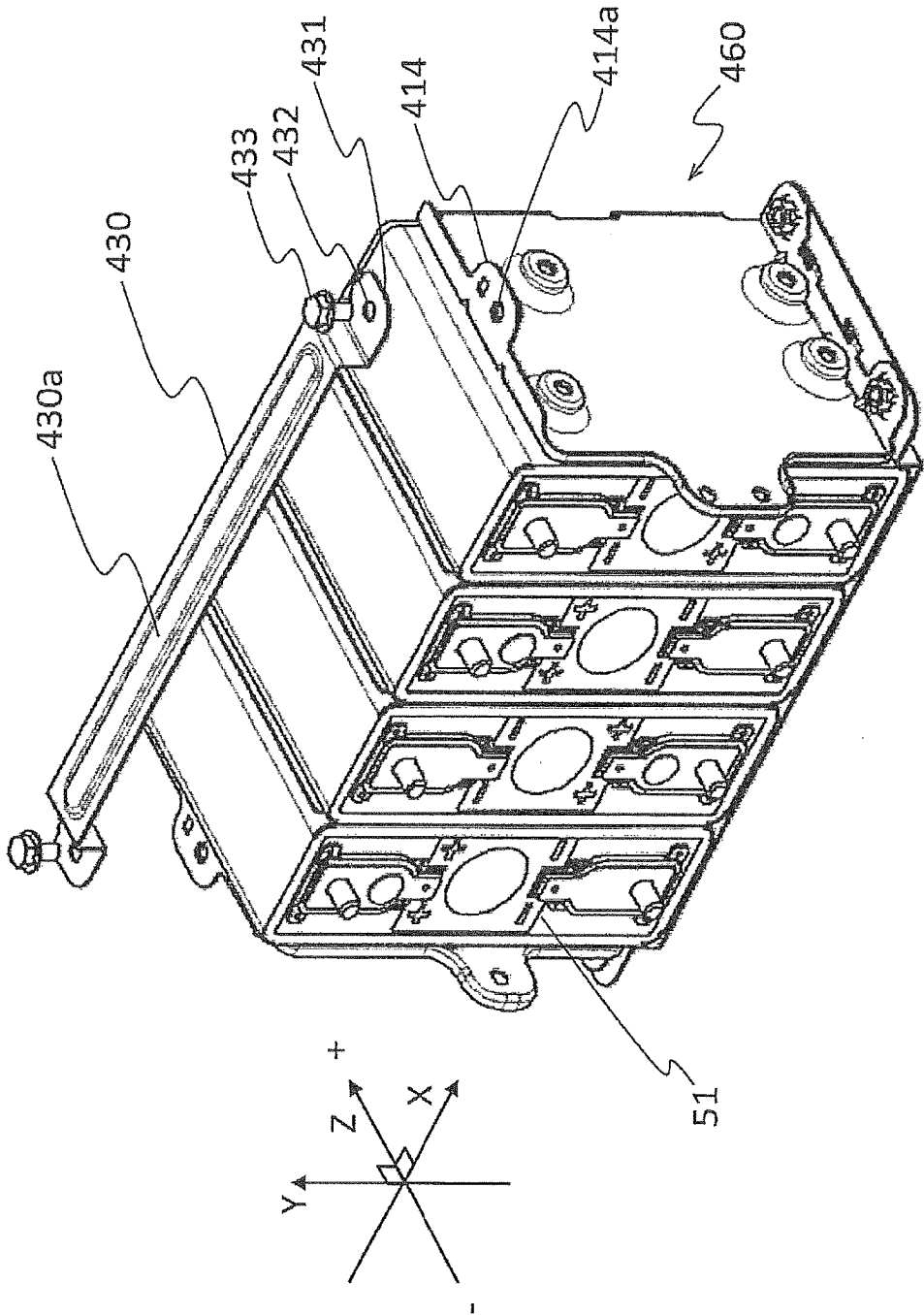
FIG. 11 is a perspective view explaining the configuration of the battery module holder according to the embodiment.
Figure 12:
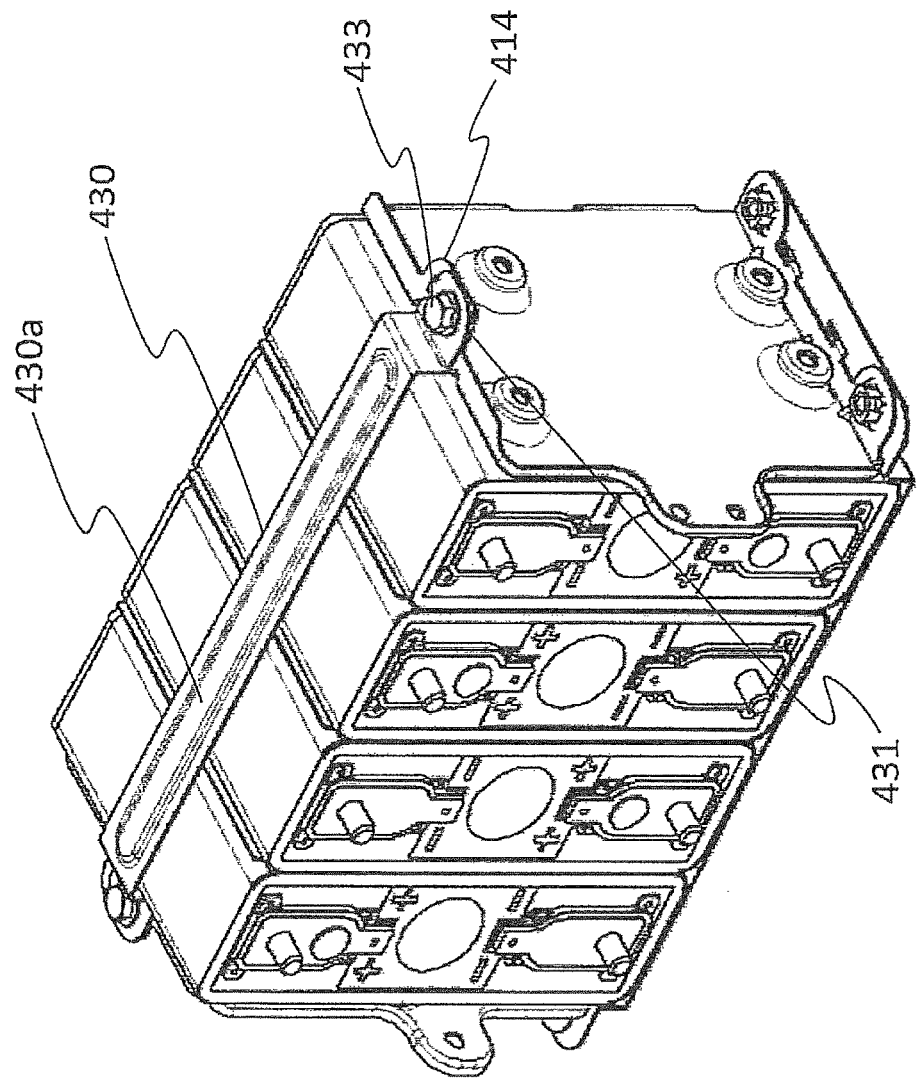
FIG. 12 is still another perspective view showing the configuration of the battery module holder according to the embodiment.

Then the third beam member 430 is attached to the battery module holder 460 now including the stack 5, over the top face of the stack 5. FIGS. 11 and 12 are perspective views showing a configuration of the battery module holder 460 and the third beam member 430 according to this embodiment.

As shown in FIG. 11, the third beam member 430 is a plate-shaped member having a tab 431 formed on each of the end portions so as to correspond to the tab 414 of the battery module holder 460, and the tab 431 includes a through hole 432 formed therethrough. The third beam member 430 also includes an elliptical protruding portion 430a formed on the surface thereof, like the first beam member 417 and the second beam member 420. The protruding portion 430a is also formed by stamping the steel plate, and hence the back surface of the third beam member 430 shown in FIG. 11 is recessed, as the reversal shape of the protrusion.

To attach the third beam member 430 to the battery module holder 460, the tab 431 is superposed on the tab 414 and fastened thereto with a bolt 433 through the through holes 432 and 414a. The tab 414 includes a nut fixed to the back surface thereof (not shown) concentrically with the through hole 414a, to be engaged with the bolt 433.

As shown in FIG. 12, the third beam member 430 is fixed to the battery module holder 460 at the respective upper edges of the holding plates 411R, 411L, and the second beam member 420 is fixed to the battery module holder 460 at the respective lower edges of the holding plates 411R, 411L. Thus, the second beam member 420 and the third beam member 430 are located so as to straightly oppose each other, holding the stack 5 therebetween.

Now, the battery cells 50 constituting the stack 5 are covered with the foregoing components of the battery module holder 460 except for the top face 51 of the battery cells 50, and restricted from moving except in the direction from the bottom face toward the top face 51 (to minus side in Z-axis direction). Accordingly, the stack 5 can be rotated about the Y-axis or Z-axis over the entire range of 360°, without disturbing the alignment of the battery cells 50. About the X-axis also, the stack 5 can be rotated within a range of 180° provided that the top faces 51 of the battery cells 50 are oriented to the plus side of the Y-axis. Therefore, the stack 5 thus held by the battery module holder 460 can be conveniently handled in the manufacturing site. In particular, the stack 5 can be moved with the top faces 51 of the battery cells 50, the bottom face of the stack 5, or the holding plates 411R, 411L oriented upward, which facilitates subsequent works of mounting additional components to the stack 5.

As described above, by sequentially attaching the second beam member 420 and the third beam member 430 to the battery module frame 410 including the first beam member 417 thereby assembling the battery module holder 460, according to this embodiment, the position of the battery cells 50 constituting the stack 5 can be restricted in each of the directions orthogonal to the direction in which the battery cells 50 are stacked. Such an arrangement eliminates the need to employ an exclusive jig or the like to maintain the shape of the stack 5, thereby improving the work efficiency in the manufacturing process of the battery module.

In addition, light-weighted and thin metal plates are employed to maintain the shape of the stack, and therefore the battery module can be made smaller in size and lighter in weight than conventional ones.

It is to be noted that the present invention is not limited to the foregoing configuration. For example, the battery module holder 460 may be constituted of the battery module frame 410 alone, or a combination of the battery module frame 410 and either of the second beam member 420 or the third beam member 430. In any of such cases, the work efficiency in the battery module assembly process can equally be secured.

Although the battery module frame 410 is formed by stamping and bending a single sheet of metal plate including the portions corresponding to the holding plates 411R, 411L and the first beam member 417 according to the embodiment, the battery module frame 410 may be composed of separate parts corresponding to the holding plate 411R, the holding plate 411L, and the first beam member 417, joined by welding or the like. However, it is preferable to form the holding plates 411R, 411L and the first beam member 417 by bending a sheet of metal plate, because in this way the holding plates 411R, 411L and the first beam member 417 can be easily obtained.

The first beam member 417 and the second beam member 420 adjacent to each other define the right angle according to the embodiment, because the battery module 470 placed on the battery module frame 410 has a hexahedral shape. The first beam member 417 and the second beam member 420 may be disposed at any desired angle according to the outer shape of the battery module to be placed thereon.

Although the protruding portions 417a1, 417b1, the recessed portion 421a and the protruding portion 430a are formed in an elliptical shape extending in the longitudinal direction of the corresponding member, those protruding portions and the recessed portion may be formed in a circular, rectangular, or any desired shape, and any desired number of those portions may be provided.

Further, although the protruding portions 417a1, 417b1, the recessed portion 421a and the protruding portion 430a are formed such that the surfaces of the corresponding members protrude on one side and are recessed on the other side as the reversal shape, the respective surfaces may be recessed on the one side and protrude on the other side as the reversal shape. In the case where the surface to be in contact with the inner wall of the container is formed to protrude, the contact area between the corresponding member and the container body 2 is reduced, and hence the impact on the container body 2 of heat generated by the operation of the power source main body 4 can be alleviated. On the other hand, in the case where the surface to be in contact with the stack 5 is formed to protrude, the contact area between the battery module holder and the stack 5 is reduced, and hence the impact of the heat from the stack 5 on the remaining portions of the power source main body 4 can be alleviated. The configuration according to this embodiment is more advantageous because the protruding shape and the recessed shape can be appropriately selected depending on the output of the stack 5, the purpose of use of the power source unit 1, and so forth.

[Configuration of Battery Module]

Hereunder, description will be given on a process of binding the stack 5 held by the battery module holder 460 thereby completing the assembly of the battery module.

Figure 13:
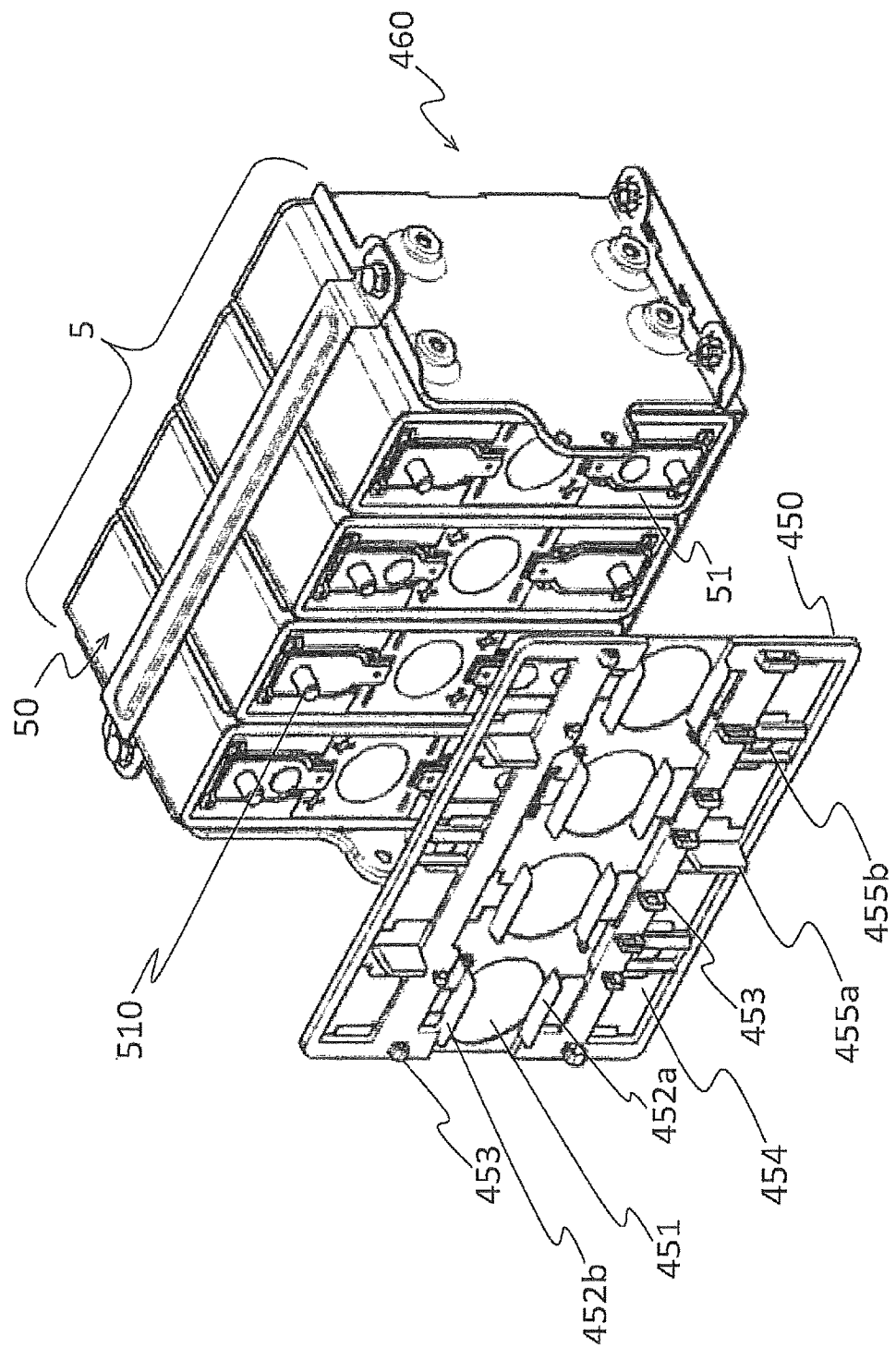
FIG. 13 is a perspective view explaining the configuration of a battery module according to the embodiment.

FIGS. 13 to FIG. 16 are perspective views explaining a configuration of the battery module according to this embodiment. As shown in FIG. 13, a harness tray 450 is superposed on the front face of the battery module holder 460 in which the stack 5 is placed.

The harness tray 450 is a rectangular insulating member that serves to retain a wire harness, formed in a shape that fits the overall shape of the front face of the stack 5. To be more detailed, the harness tray 450 is a plate-shaped member made of a synthetic resin, and includes windows 454 through which the electrode terminals 510 of the battery cells 50 located on the front face of the stack 5 are exposed to outside, and windows 451 through which the safety valves 530 are exposed to outside. In other words, each of the electrode terminals 510 of the battery cells 50 is exposed through a corresponding one of the windows 454, and the safety valve 530 of each of the battery cells 50 is exposed through a corresponding one of the windows 451.

In addition, fixing hooks 453 for grouping and fixing the wire harness to be described later are provided on the surface of the harness tray 450, at positions between the windows 451 and the windows 454. The fixing hook 453 is a ring-shaped member having a small gap, in a side view of the stack 5.

The harness tray 450 also includes tall frames 455a prominently projecting from the main surface of the tray and low frames 455b having generally the same thickness as the main surface of the tray, at positions between the adjacent windows 454. The locations of the tall frames 455a and the low frames 455b correspond to the connection points of the battery cells 50 constituting the stack 5.

Further, the harness tray 450 includes ribs 452a corresponding to the first projecting portions and ribs 452b corresponding to the second projecting portions, projecting upright from the harness tray 450 at the respective upper end and lower end of the windows 451. The ribs 452a and the ribs 452b are aligned in the direction in which the battery cells 50 are stacked, and constitute a pair of guides.

Figure 14:
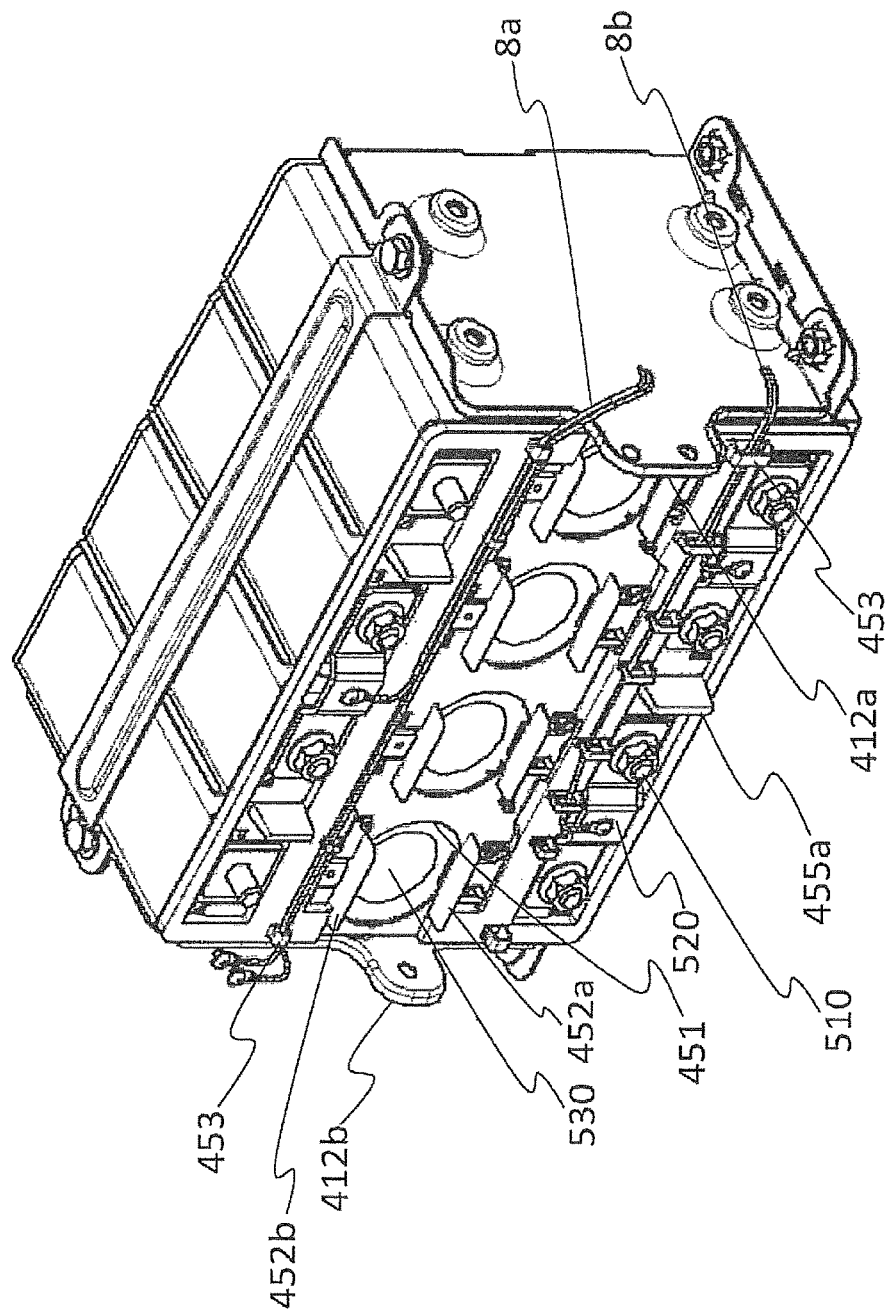
FIG. 14 is another perspective view explaining the configuration of the battery module according to the embodiment.

Referring to FIG. 14, the bus bars 520 are placed to connect the electrode terminals 510 of opposite polarities of the battery cells 50 located adjacent to each other, upon superposing the harness tray 450 on the front face of the stack 5. The bus bars 520 are each superposed on the harness tray 450 so as to stride over the corresponding low frame 455b, and the tall frame 455a is located between the adjacent bus bars 520 to prevent a short circuit between the bus bars.

Then the wire harnesses 8a, 8b are respectively fitted in the fixing hooks 453. The wire harnesses 8a, 8b include signal lines between the control circuit 6 and the relay circuit 7.

When the harness tray 450 is attached in place, the ribs 452a and the ribs 452b are located so as to hold therebetween the tabs 412a, 412b of the battery module holder 460, in a side view of the stack 5.

Figure 15:
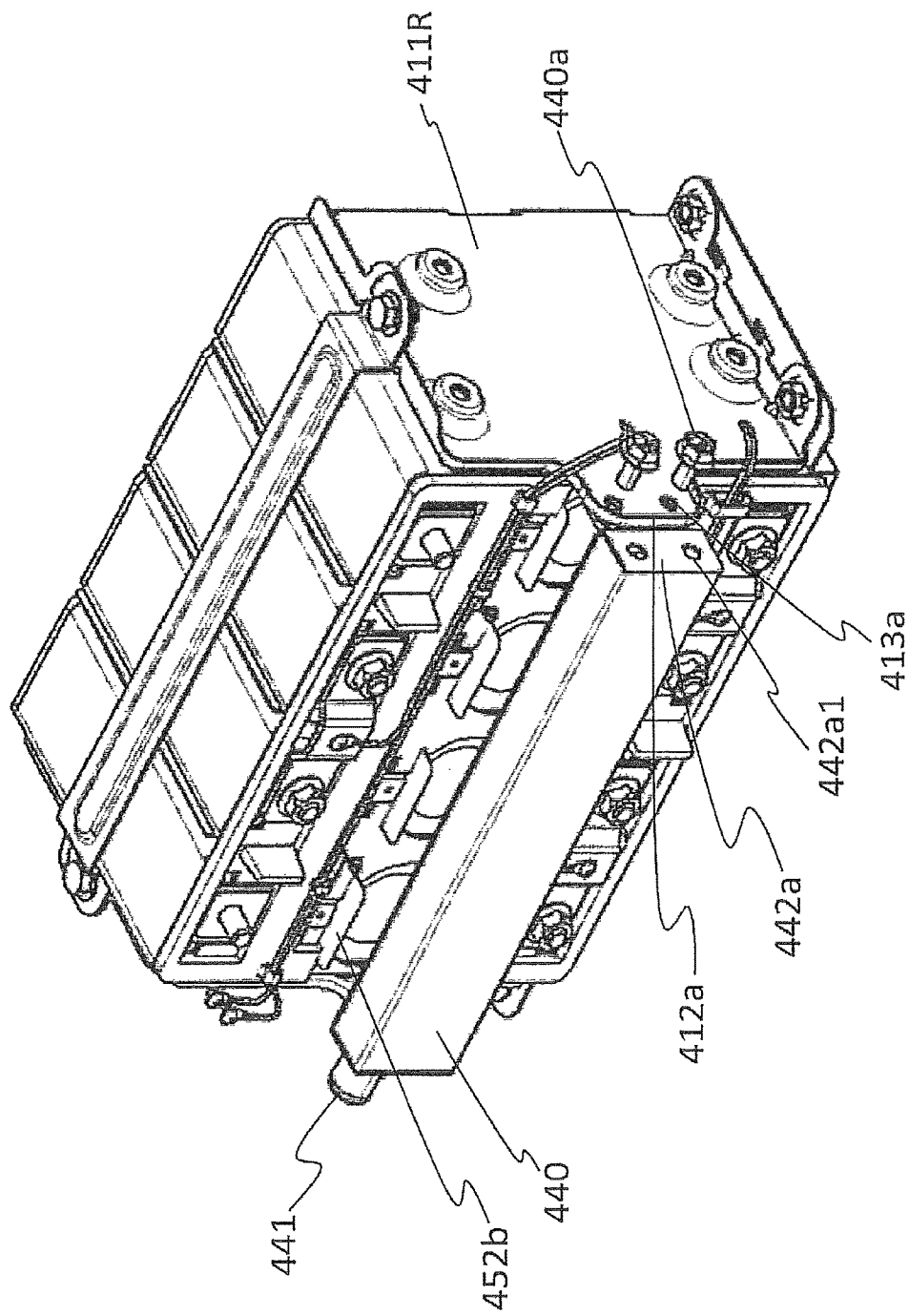
FIG. 15 is still another perspective view explaining the configuration of the battery module according to the embodiment.

Referring to FIG. 15, a coupling member 440 is provided between the tab 412a and the tab 412b of the battery module holder 460. The coupling member 440 is fixed to the holding plates 411R, 411L, upon being fixed to the tabs 412a, 412b. The coupling member 440 is a bar-shaped member made by forming a steel plate into a box shape, and makes surface contact with the inner face of the tab 412a and the tab 412b via respective end faces 442a and 442b of the coupling member 440. The end face 442a includes through holes 442a1, so that a bolt 440a is inserted for fastening through the through hole 413a of the tab 412a and the through holes 442a1. The other end face of the coupling member 440, which is hidden in FIG. 15, is similarly configured.

Proceeding to FIG. 16, the coupling member 440 is disposed to extend in the direction in which the battery cells 50 are stacked and to oppose each of the battery cells 50, and fixed to the holding plates 411R, 411L so as to bind the battery cells 50.

Now, all the faces of the battery cells 50 constituting the stack 5, including the top face 51, are covered with the respective beam members of the battery module holder 460 and the coupling member 440. In addition, the holding plates 411R, 411L of the battery module holder 460 press the stack 5 with a force proportional to the tightening torque of the bolt 440a. Thus, the battery module 470 is obtained, in which the stack 5 is held with a predetermined binding pressure so that the shape of the stack 5 can be maintained against the swelling pressure of the battery cells 50 generated with the continued use of the power source unit 1.

The harness tray 450 is provided between the coupling member 440 and the battery cells 50. The harness tray 450 includes on the surface thereof the ribs 452a, 452b corresponding to the projecting portions located along at least one of the side faces of the coupling member 440 and adjacent thereto, and sticking toward the coupling member 440.

The ribs 452a are located, when the faces of the battery cells 50 opposing the coupling member 440 are oriented parallel to the vertical direction, adjacent to and along the lower side face of the coupling member 440 in the vertical direction. Likewise, the ribs 452b are located, when the faces of the battery cells 50 opposing the coupling member 440 are oriented parallel to the vertical direction, adjacent to and along the upper side face of the coupling member 440 in the vertical direction.

A feature of the battery module 470 configured as above according to this embodiment is that the harness tray 450 includes the ribs 452a and the ribs 452b. As shown in FIG. 15, the positions of the ribs 452a and the ribs 452b constituting a pair of rows on the harness tray 450 are determined according to the positions of the tab 412a and the tab 412b of the battery module holder 460, and the clearance between the rows of the ribs 452a and the ribs 452b is determined so as to fit the width of the coupling member 440 (size in the vertical direction). Therefore, the coupling member 440 is attached to the battery module holder 460 at the fixed position defined by the ribs 452a and the ribs 452b.

Providing thus the harness tray 450 including the ribs 452a and the ribs 452b allows the coupling member 440 to be temporarily fixed easily to the holding plates 411R, 411L of the battery module holder 460, without the need to employ an exclusive jig or the like, thereby reducing the working time for assembling the battery module 470 and thus improving the production efficiency.

In addition, the ribs 452a corresponding to the first projecting portions are formed along the lower side face of the coupling member 440, and therefore the coupling member 440 can be easily placed utilizing the ribs 452a as a support. Further, since the ribs 452b corresponding to the second projecting portions are formed along the upper side face of the coupling member 440, the ribs 452a, 452b can be conveniently utilized to retain the coupling member 440 from the upper and lower side faces, thus to easily locate the coupling member 440 in place.

Further, since the completed battery module 470 binds the stack 5 with the battery module holder 460 composed of light-weighted and thin metal plates, the battery module 470 can be made smaller in size and lighter in weight than conventional ones.

Although two rows of ribs, namely the ribs 452a and the ribs 452b are provided on the harness tray 450 in this embodiment, the harness tray 450 may include only either of the rows of ribs. Such a configuration is advantageous when the assembly is performed with the stack 5 laid down so that the harness tray 450 is oriented upward. Further, providing only the lower ribs 452a is more preferable, because the coupling member 440 can be prevented from falling off also when the harness tray 450 is vertically oriented for performing the assembly work, as shown in FIG. 15.

Although one set of the rib 452a and the rib 452b is provided for each of the battery cells 50 in this embodiment, one of the rib 452a and the rib 452b may be alternately provided in a checkerboard pattern for each battery cell 50. Provided that at least one pair of ribs 452a, 452b is formed on the harness tray 450 on the whole, the aforementioned effects can be secured.

It is to be noted that the present invention is not limited to the foregoing configuration. According to the embodiment, the battery module frame 410 includes the tabs 412a, 412b projecting from the respective edges of the holding plates 411R, 411L and the coupling member 440 is fixed between these tabs. Alternatively, the through holes may be formed on the holding plates instead of forming the tabs and the coupling member may be held directly between the holding plates. However, forming the tabs is more advantageous because the holding plates can be made smaller in size and the total weight of the battery module can be reduced.

Although the coupling member 440 is formed in a bar shape by processing a steel plate into a box shape in the embodiment, the structure of the coupling member is not specifically limited and may be, for example, formed from a solid metal bar or the like.

Although the top faces 51 of the battery cells 50 are oriented as the front face of the battery module 470, the top faces 51 of the battery cells 50 may be located so as to constitute the top face of the battery module.

[Configuration of Coupling Member]

Hereunder, description will be given on the configuration of the coupling member that binds the stack 5 held by the battery module holder 460 to complete the assembly of the battery module 470.

FIGS. 17A to 18B are perspective views explaining the configuration of the coupling member 440 employed in the battery module 470 according to the embodiment.

Figure 17A:
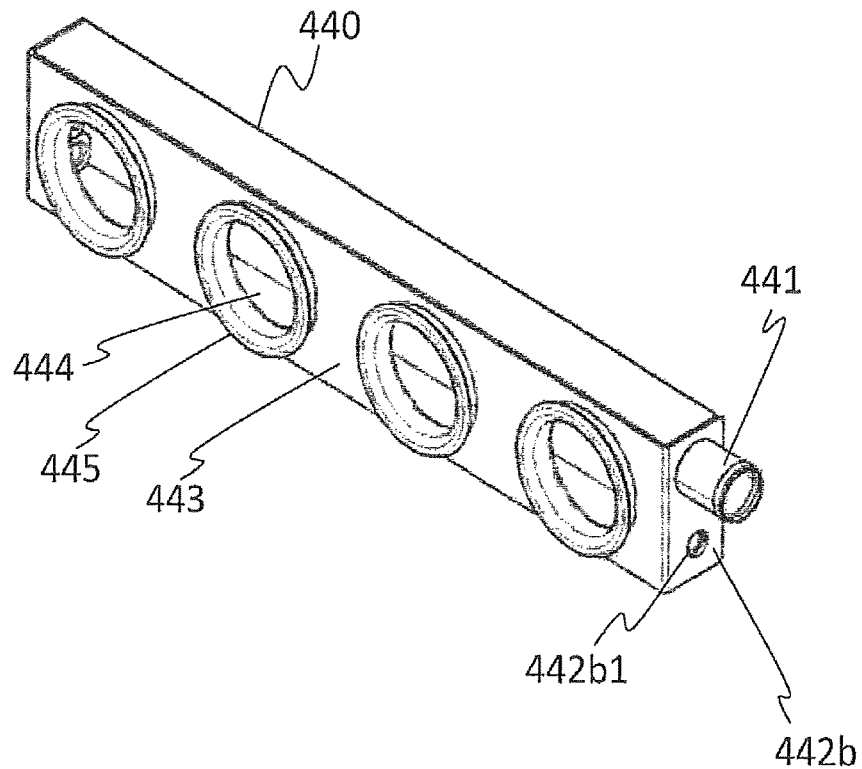
FIG. 17A is a perspective view showing the configuration of a coupling member of the battery module according to the embodiment.
Figure 17B:
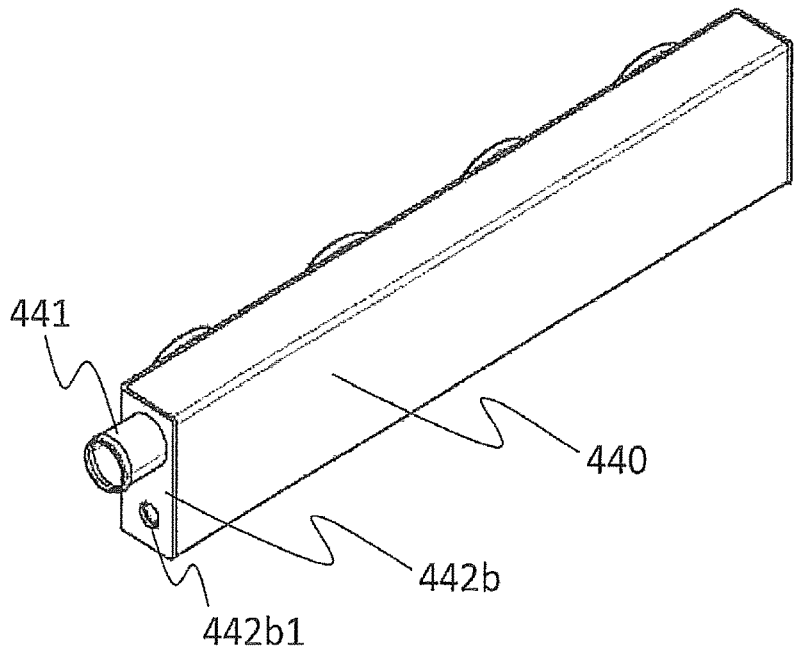
FIG. 17B is another perspective view showing the configuration of the coupling member of the battery module according to the embodiment.

Referring first to FIGS. 17A and 17B, the coupling member 440 has a bar shape formed by processing a steel plate into a box shape and includes, as on the end face 442a shown in FIG. 15, a through hole 442b1 formed on the other end face 442b. In addition, a cylindrical outlet port 441 having an open end is provided at an upper position of the through hole 442b1.

As shown in FIG. 17A, a hollow space is formed inside the coupling member 440, and circular openings 444 are provided on a main surface 443 to be opposed to the front face of the stack 5. At least one of the battery cells 50 is provided with the safety valve 530 located on the face thereof opposing the coupling member 440, and the opening 444 straightly opposes the safety valve 530 of the battery cell 50, through the window 451 of the harness tray 450. In this embodiment, all of the battery cells 50 have the safety valve 530 on the face thereof opposing the coupling member 440, and the openings 444 are provided for the respective safety valves 530.

A ring-shaped packing 335 made of synthetic rubber or the like is provided around each opening 444. The packing 335 serves to seal the periphery of the safety valve 530 when the coupling member 440 is fixed to the battery module holder 460. Here, the outlet port 441 also communicates with the inner space in the coupling member 440.

As shown in FIG. 15, a nut 442a2 concentric with the through hole 442a1 is fixed to the back surface of the end face 442a of the coupling member 440, so that the bolt 440a can be fastened. The end face 442b is also similarly configured.

A feature of this embodiment is that the coupling member 440 includes the inner space that allows communication between each of the openings 444 and the outlet port 441.

In the case of employing non-aqueous electrolyte secondary batteries, for example lithium ion secondary batteries, as the battery cells 50 constituting the battery module 470, the electrolyte loaded in the casing of the battery cell 50 is decomposed, for example owing to overcharging from continued use of the power source unit 1, and gas emerges inside the casing of the battery cell 50. Pole plates in the casing also swell because of expansion of the active material layer. To prevent deformation or breakdown of the casing originating from the emergence of gas and the expansion of the pole plates, the battery cell 50 is configured to open the safety valve 530 in the case where the internal pressure in the casing exceeds a predetermined threshold, to thereby discharge the gas to outside of the casing.

In this embodiment, accordingly, a piping is provided integrally with the coupling member 440 binding the stack 5, for conducting the gas from the battery cell 50 to outside of the power source unit 1. To be more detailed, the gas released from the safety valve 530 blows out into the coupling member 440 through the opening 444, and is discharged through the outlet port 441. As shown in FIG. 5, the outlet port 441 is connected to the drain pipe 442 made of a synthetic resin, and hence the gas further flows through the drain pipe 442 to be discharged out of the power source unit 1. The coupling member 440 has sufficient mechanical strength to suppress the deformation of the stack 5 as the intrinsic function of the coupling member 440, and therefore has sufficient durability as a piping to withstand changes with time.

Further, in the case where the stack 5 is laid side face up so that the top faces 51 with the electrode terminals 510 are vertically oriented, and the coupling member 440 is opposed to the top faces of the battery cells 50, the following advantage is obtained. When the safety valve 530 opens because of the increase in internal pressure caused by the gas originating from the decomposition of the electrolyte, the electrolyte may also blow out together with the gas through the safety valve 530. Even in such a case the configuration according to this embodiment allows the electrolyte that has blown out to be retained within the coupling member 440, thereby preventing accidental leakage of the electrolyte out of the stack 5.

As described above, this embodiment achieves reduction in number of parts and reduction in weight of the battery module, which leads to improved production efficiency, and thus provides a battery module that is compact but offers high performance, and a power source unit incorporated with such a battery module.

Figure 18A:
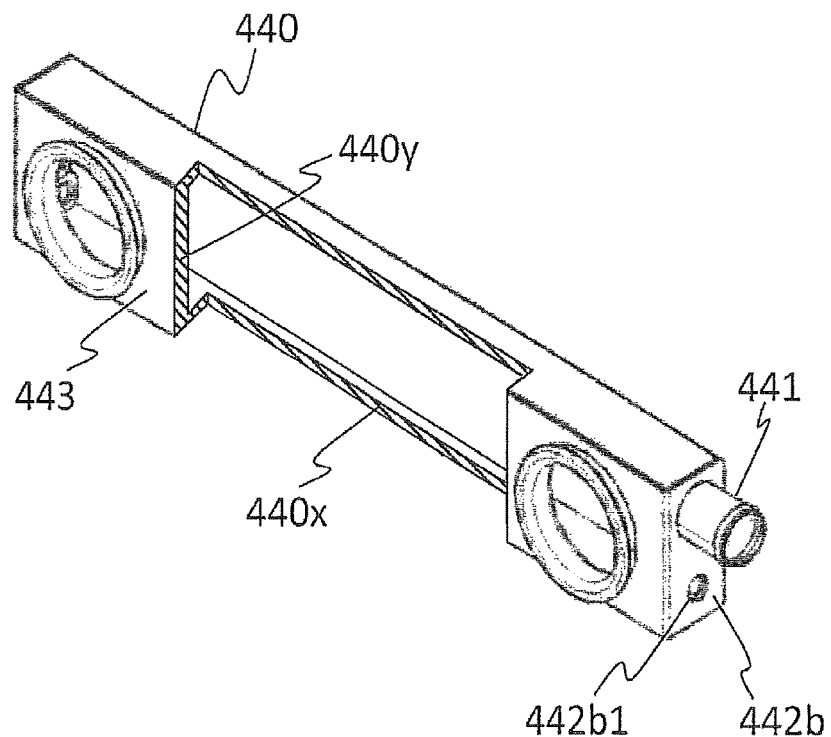
FIG. 18A is a perspective view showing a variation of the coupling member of the battery module according to the embodiment.

Regarding the box-shape configuration of the coupling member 440, it is preferable that the wall thickness 440y of the main surface 443 of the coupling member 440, directly opposing the stack 5 in parallel thereto, is thicker than the wall thickness 440x of the side faces orthogonally adjacent to the main surface 443, as shown in FIG. 18A. In this case, the portion oriented perpendicular to the fastening direction of the bolt 440a gains a larger sectional area and hence mechanical strength in the fastening direction can be secured, while securing a sufficient size of inner space for use as a gas discharge pipe.

Figure 18B:
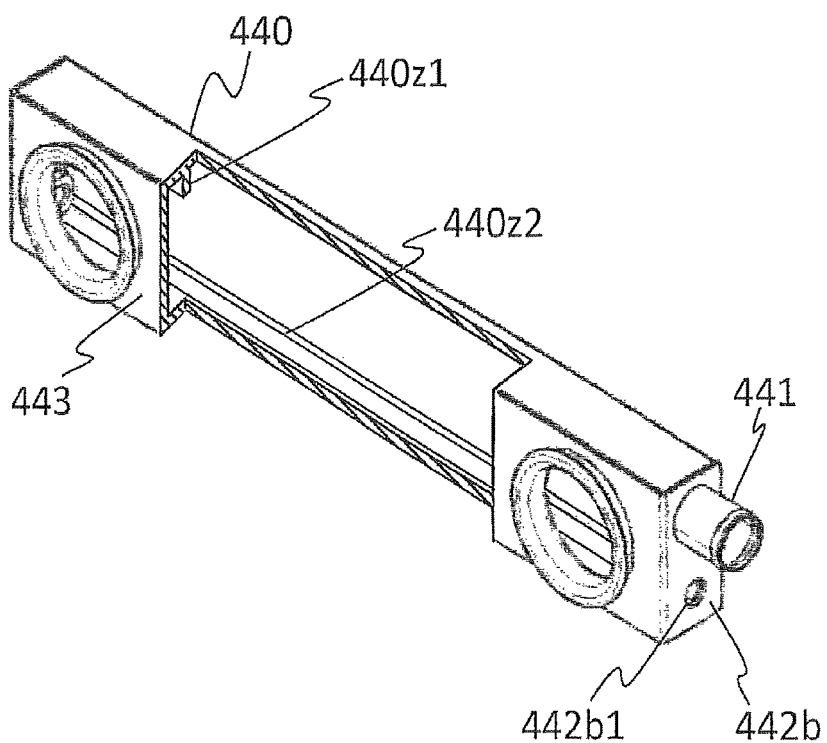
FIG. 18B is a perspective view showing another variation of the coupling member of the battery module according to the embodiment.

Alternatively, as shown in FIG. 18B, ribs 440z1, 440z2 may be formed on the inner wall of the coupling member 440, so as to extend in the longitudinal direction all the way between the respective inner walls of the end faces 442a and 442b. Such a configuration also improves the durability in the fastening direction, like the configuration shown in FIG. 18A. Here, although the ribs 440z1 and 440z2 are formed on the upper and lower inner walls of the coupling member 440 according to FIG. 18B, the rib may be formed only on either inner wall. Alternatively, the rib may be formed on at least one of the front and the rear inner walls of the coupling member 440.

The present invention is not limited to the foregoing configuration.

Instead of the rectangular box shape, the coupling member 440 may be formed in any shape, for example a cylindrical shape, provided that an inner space for communication between the safety valve 530 on the battery cell 50 and the cover 3 can be secured. Accordingly, the outer shape of the safety valve 530 on the battery cell 50, as well as the shape of corresponding opening 444 of the coupling member 440, may be rectangular or any desired shape instead of circular.

According to the embodiment, the battery module frame 410 includes the tabs 412a, 412b projecting from the respective edges of the holding plates 411R, 411L and the coupling member 440 is fixed between the tabs 412a, 412b. Alternatively, the through holes may be formed on the holding plates instead of forming the tabs 412a, 412b and the coupling member 440 may be held directly between the holding plates. However, forming the tabs 412a, 412b is more advantageous because the holding plates 411R, 411L can be made smaller in size and the total weight of the battery module 470 can be reduced.

Although the outlet port 441 is located at an upper position on the end face 442b of the coupling member 440 and the through hole 442b1 is located under the outlet port 441, the outlet port 441 may be provided on the side face of the coupling member 440, and the end face 442b may be formed in the same shape as that of the end face 442a. In this case, the holding plates 411R, 411L of the battery module frame 410 can be formed in a symmetrical shape including the shape of the tabs, which contributes to improving the production efficiency of the battery module holder. In addition, the coupling member 440 can be attached with better fastening balance on the respective end portions, to bind the stack 5.

Although the outlet port 441 is located adjacent to the tab 412b in the foregoing configuration, tab 412b may include a through hole or a cutaway portion so that the outlet port 441 may stick out therethrough. In this case, the portion of the end face 442b close to the outlet port 441 is also brought into surface contact with the tab 412b, which also improves the fastening balance on the respective end portions of the coupling member 440, when binding the stack 5.

Further, although the top faces 51 of the battery cells 50 are oriented as the front face of the battery module 470, the top faces 51 of the battery cells 50 may be located so as to constitute the top face of the battery module.

Further, the harness tray 450 may be excluded from the structure of the battery module 470.

[Disposition of Management Circuit (Electric Device)]

Hereunder, description will be given on placement of a management circuit (electric device) that allows the battery module 470 to function as a chargeable and dischargeable power source unit.

Figure 19:
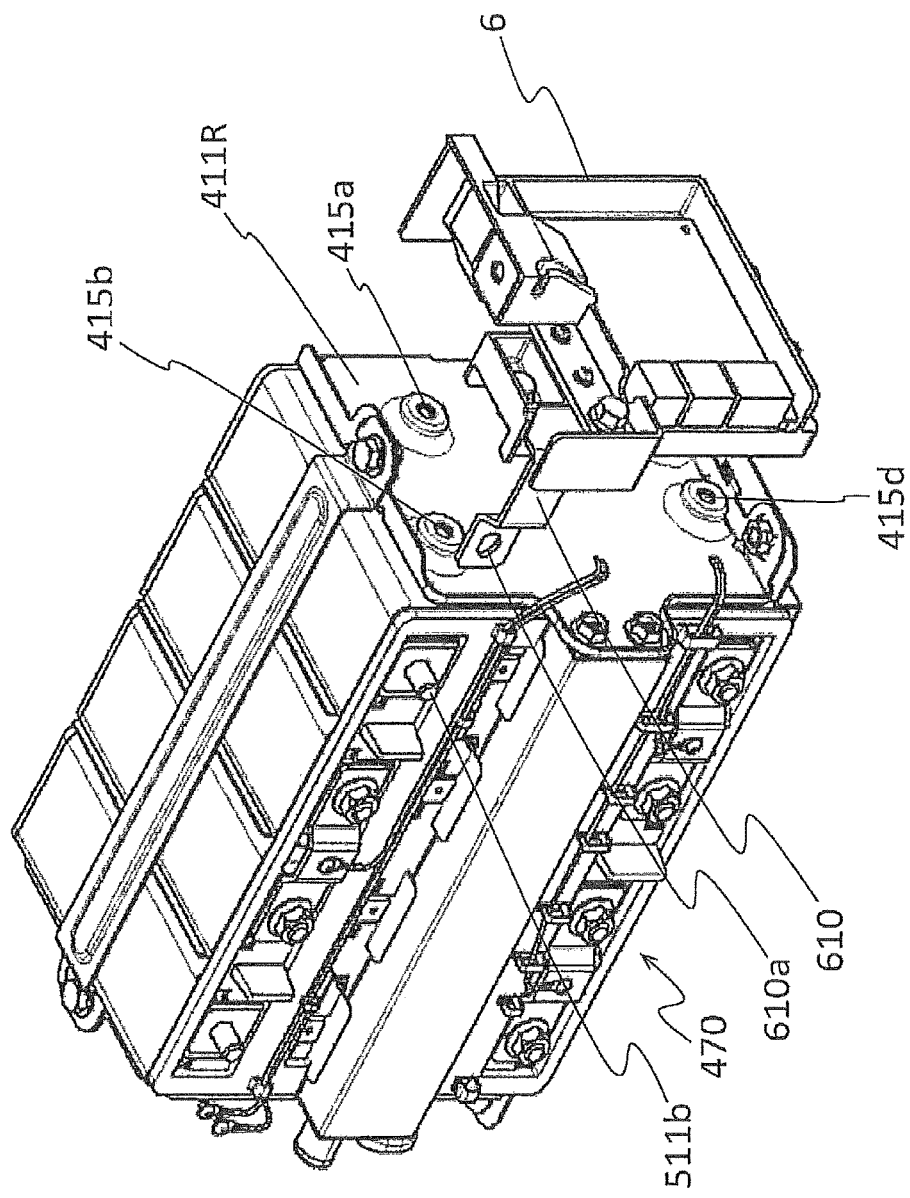
FIG. 19 is a perspective view explaining the location of a management circuit (electric device) of the power source unit according to the embodiment.
Figure 20:
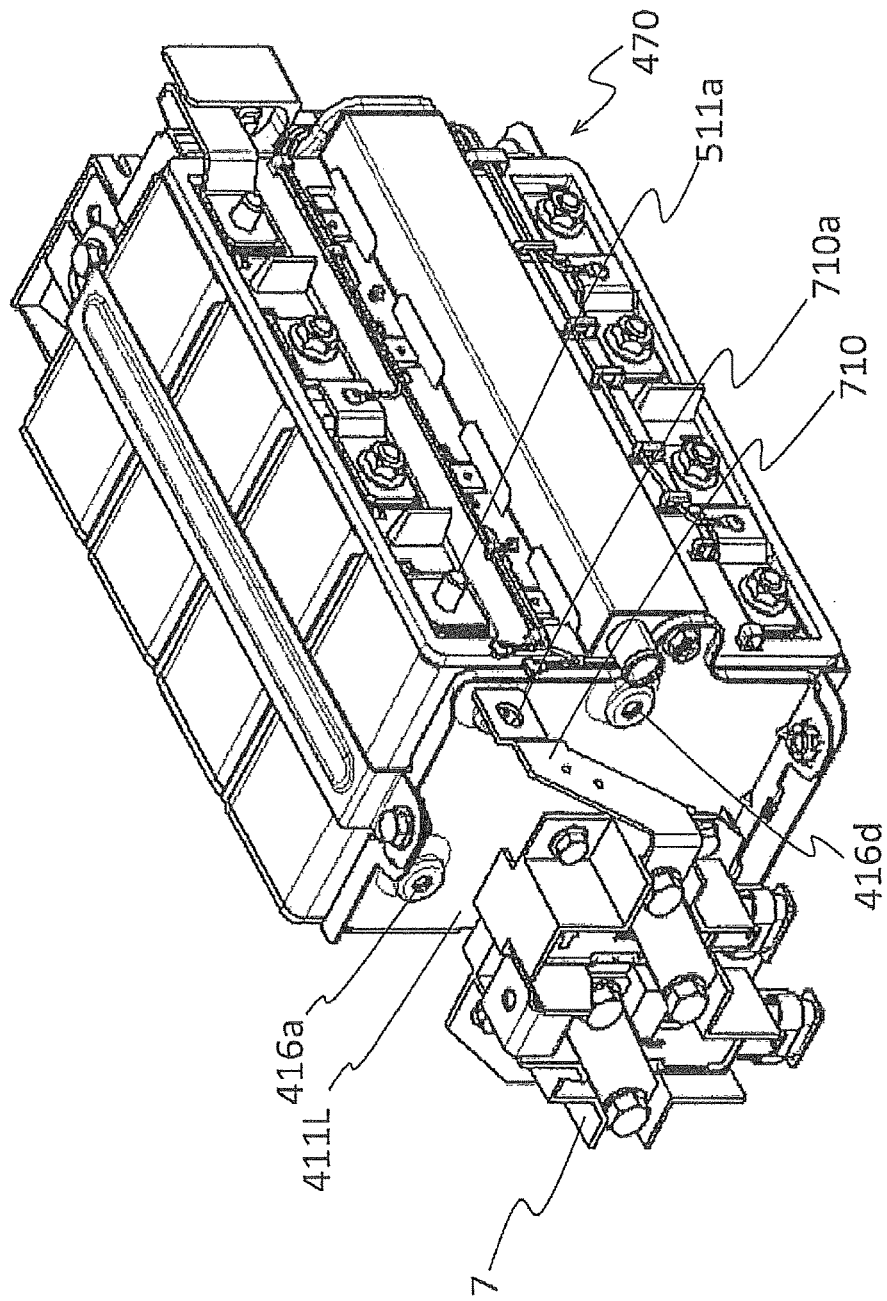
FIG. 20 is another perspective view explaining the location of a management circuit (electric device) of the power source unit according to the embodiment.

FIGS. 19 and 20 are perspective views explaining the disposition of the management circuit (electric device) of the power source unit according to the embodiment.

Referring first to FIG. 19, the control circuit 6 is attached to the holding plate 411R on the right-hand side face of the battery module 470. The control circuit 6 and the holding plate 411R are coupled via the through holes 415a, 415b, 415, and 415d formed in the holding plate 411R, for example shown in FIGS. 6 and 19. The electrical connection between the control circuit 6 and the battery module 470 is established upon fitting a through hole 610a of the joint member 610 to the negative electrode terminal 511b of the stack 5.

Likewise, as shown in FIG. 20, the relay circuit 7 is attached to the holding plate 411L on the left-hand side face of the battery module 470. The relay circuit 7 and the holding plate 411L are coupled via the through holes 416a to 416d formed in the holding plate 411L, for example shown in FIGS. 6 and 19. The electrical connection between the relay circuit 7 and the battery module 470 is established upon fitting a through hole 710a of the joint member 710 to the positive electrode terminal 511a of the stack 5.

The through holes 415a to 415d are formed through semispherical projections 415a1 to 415d1 formed on the holding plate 411R by punching, as shown in FIGS. 16 and 19. In addition, ring-shaped packings 415a2 to 415d2 made of synthetic rubber are provided around the respectively corresponding through holes 415a to 415d. The through holes 416a to 416d in the holding plate 411L are similarly configured, and hence the description will not be repeated.

On the back surface of the holding plate 411R opposing the side face of the stack 5, recessed portions are formed as the reversal shape of the projections 415a1 to 415d1, and a nut for fastening the bolt inserted from the control circuit 6 is fixed to the deepest bottom of each recessed portion. Here, FIG. 6 illustrates the back surface of the holding plate 411L, in which similar recessed portions and the corresponding nuts 416a3 to 416d3 are provided.

Figure 21:
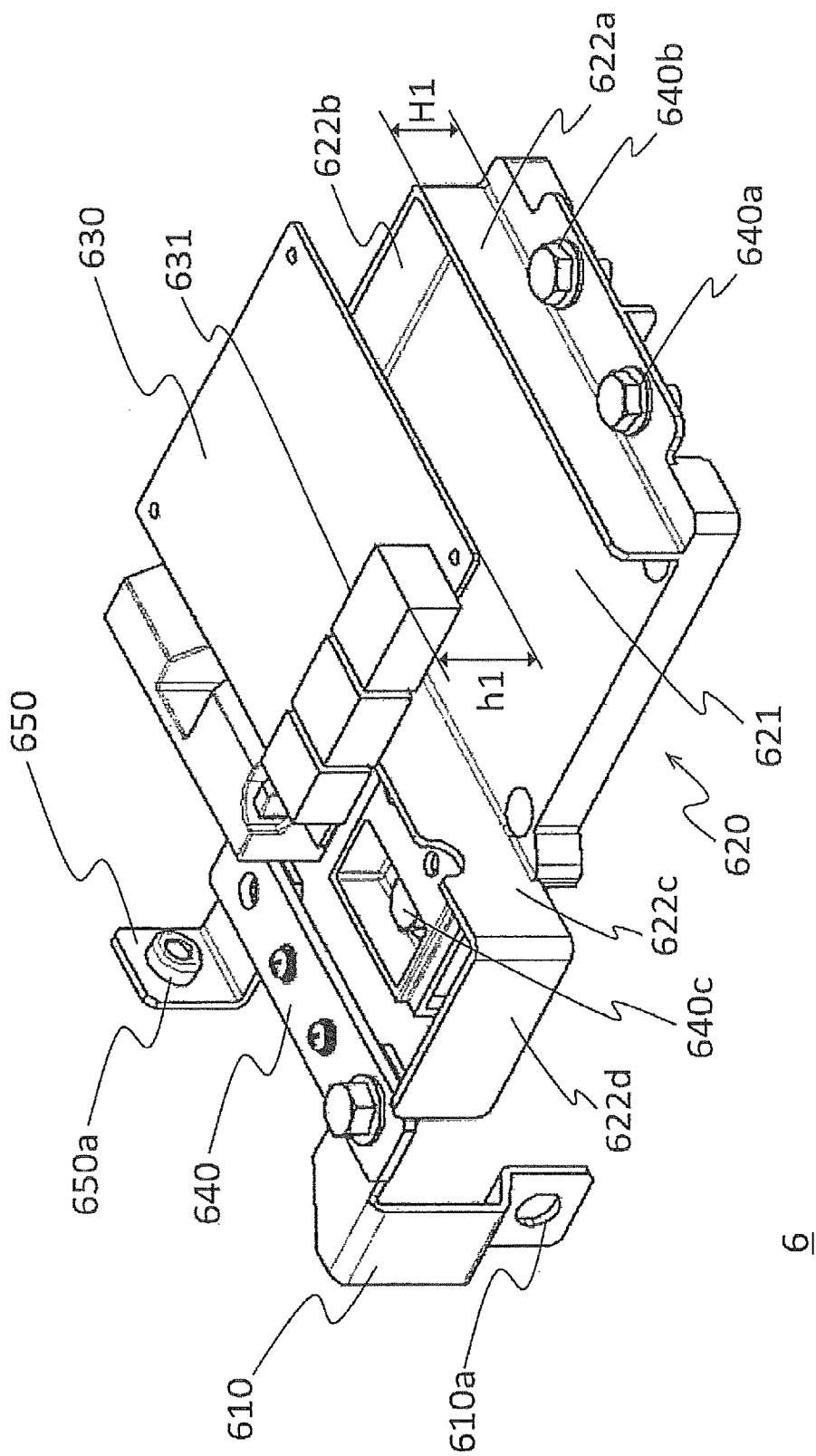
FIG. 21 is an exploded perspective view showing the configuration of a control circuit of the power source unit according to the embodiment.

The control circuit 6 includes, as shown in FIG. 21, a base 620 made of a synthetic resin, and a circuit board 630 having a circuit element 631 mounted thereon, the circuit board 630 being attached to the base 620. Bolts 640a, 640b provided in the lower end portion of the base 620, and a bolt 640c and another bolt (hidden by the circuit board 630 in FIG. 21) provided in the upper portion of the base 620 are engaged with the through holes 415d, 415c, 415b, and 415a, respectively, for fastening. FIG. 21 is an exploded perspective view showing the configuration of the control circuit 6 of the power source unit 1 according to the embodiment.

Figure 22:
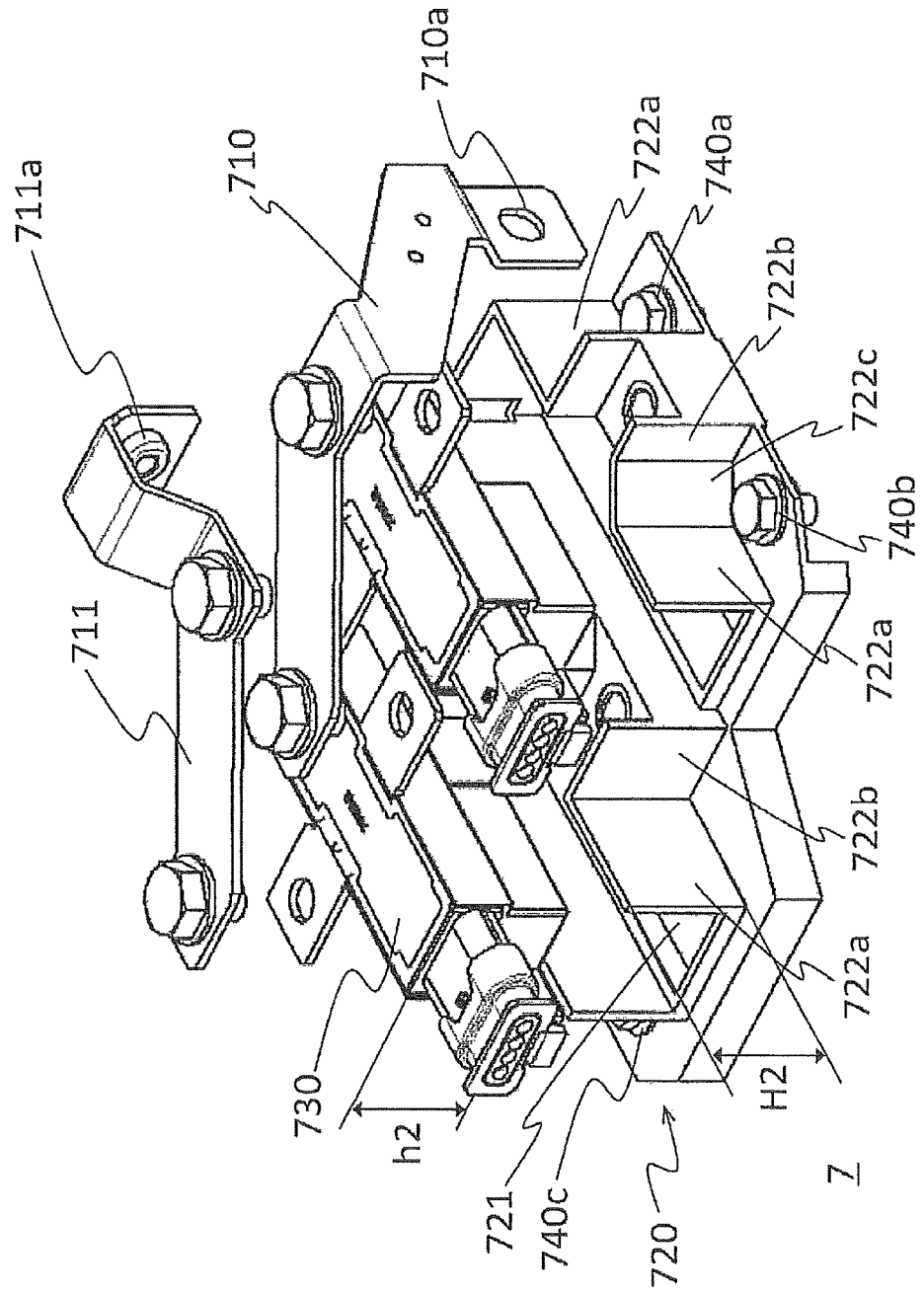
FIG. 22 is an exploded perspective view showing the configuration of a relay circuit of the power source unit according to the embodiment.

Likewise, the relay circuit 7 includes a base 720 made of a synthetic resin and relay elements 730 attached to the base 720, as shown in FIG. 22. Bolts 740a, 740b provided on the right-hand side face of the base 720, and a bolt 740c and another bolt (hidden by the base 720 in FIG. 22) provided on the left-hand side face of the base 720 are engaged with the through holes 416b, 416d, 416c, and 416a, respectively, for fastening. FIG. 22 is an exploded perspective view showing the configuration of the relay circuit 7 of the power source unit 1 according to the embodiment.

A feature of this embodiment is that the control circuit 6 and the relay circuit 7 are fixed to the respective side faces of the battery module 470 at positions eccentric from the center of the side faces, according to the location of the through holes.

Explanation of the above will be given hereunder, focusing on the relation between the control circuit 6 and the holding plate 411R. As shown in FIG. 6, the through holes 415a and 415b are generally horizontally aligned in the vicinity of the upper edge of the holding plate 411R. The through holes 415b and 415d are generally vertically aligned in the vicinity of the side edge of the holding plate 411R on the side of the tab 412a. The through holes 415d and 415c are generally horizontally aligned in the vicinity of the lower edge of the holding plate 411R. The through holes 415c and 415a are generally vertically aligned in the vicinity of the side edge of the holding plate 411R on the side of the first beam member 417.

The control circuit 6 is fixed with two bolts provided to two through holes constituting one of the horizontal and vertical rows out of the four rows described above, and the remaining two through holes are left unfastened or fastened with the bolt with a low tightening torque, so that the base 620 can swing in the vicinity of the fastening positions.

Such an arrangement provides the following advantageous effect. In the case where the outer shape of the battery module frame 410 is deformed because of the swelling of the stack 5 originating from an increase in internal pressure in the battery cell 50, for example due to overcharging, the deformation is presumed to most prominently appear outwardly from the center of the holding plates 411R, 411L, in the direction in which the battery cells 50 are stacked. This is because the holding plates 411R, 411L having a rectangular outer shape have the respective edges fixed by the first beam member 417, the second beam member 420, the third beam member 430, and the coupling member 440, and are hence less susceptible to the deformation.

In the case where the surface of the holding plate 411R is deformed so as to protrude from the center O (see FIGS. 23A to 23C), the control circuit 6 located at the center of the holding plate 411R is subjected to a stress originating from the deformation of the holding plate 411R.

Figure 23A:
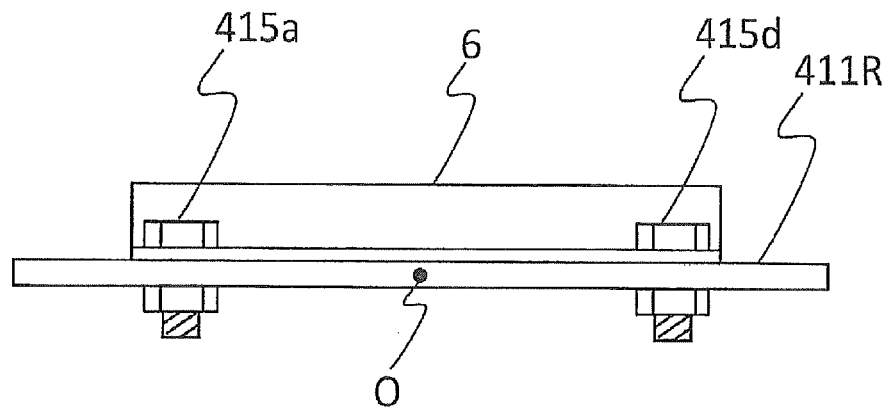
FIG. 23A is a schematic drawing explaining the location of the control circuit of the power source unit according to the embodiment.
Figure 23B:
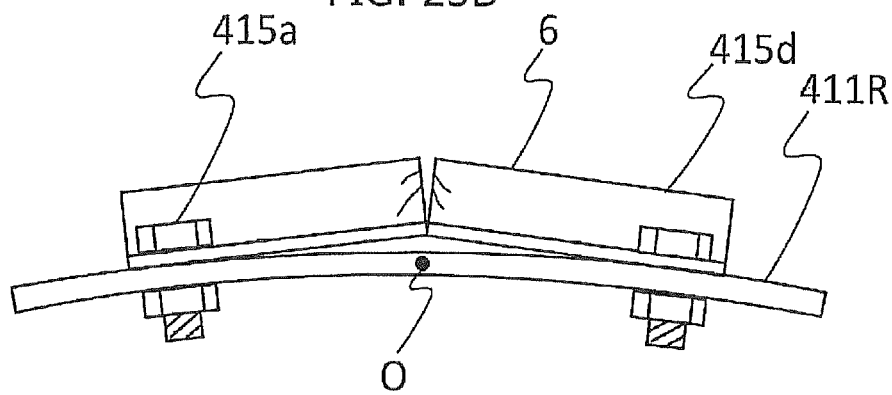
FIG. 23B is another schematic drawing explaining the location of the control circuit of the power source unit according to the embodiment.
Figure 23C:
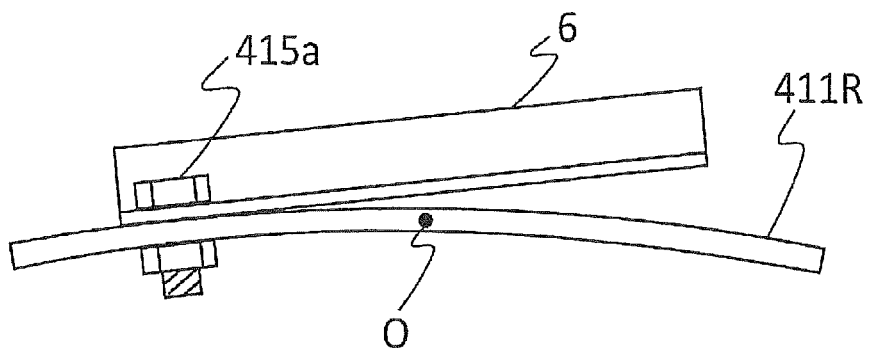
FIG. 23C is still another schematic drawing explaining the location of the control circuit of the power source unit according to the embodiment.

At this point, in the case where the control circuit 6 is fixed with the bolts 415a and 415d so as to stride over the center O of the holding plate 411R as shown in FIG. 23A, the control circuit 6 may suffer a damage such as deformation or breakdown of the base 620 or the circuit board 630 by the elevation of the center O as shown in FIG. 23B, or the control circuit 6 may even fall off from the holding plate 411R. FIGS. 23A to FIG. 23C are schematic drawings for explaining the situations of the control circuit 6 of the power source unit 1 according to the embodiment.

In this embodiment, accordingly, the control circuit 6 is fixed to the holding plate 411R along one of the horizontal or vertical rows of the through holes so as not to stride over the center O of the holding plate 411R, and therefore the base 620 can move, even when the surface of the holding plate 411R is deformed, so as to conform to the deformation.

The example shown in FIG. 23C represents the case where the control circuit 6 is fixed with the bolts 415a and 415b (bolt 415b is hidden) aligned on the same side of the center O. As illustrated, since the bolts forming a vertical or horizontal row on the control circuit 6 are not located so as to stride across the center O of the surface of the holding plate 411R, one of the edges of the control circuit 6 can be displaced as a free end.

Such a configuration prevents the control circuit 6 from being subjected to the stress originating from the deformation of the holding plate 411R, thereby improving the reliability of the power source unit 1.

It is to be noted that the present invention is not limited to the foregoing configuration. According to the above, the positions to fix the control circuit 6 to the holding plate 411R or the relay circuit 7 to the 411L are arranged so as not to stride across the center of the holding plate 411R or 411L. Here, the center may be defined on the basis of the form of the holding plate 411R or 411L, however different definitions may be adopted. For example, the center may be defined as a region including the intersection of the diagonal lines of the through holes dispersedly positioned on the holding plate 411R or 411L. Alternatively, the center may be defined as a position where the deformation is most prominent, detected through industrial inspection or simulation by using samples of the battery module 470 made up in advance.

Alternatively, the control circuit 6 or the relay circuit 7 may be fixed only at the center of the holding plate 411R or 411L. As is apparent from FIG. 23B, the control circuit 6 or the relay circuit 7 is exempted from suffering the stress originating from the deformation of the holding plate 411R or 411L, when fixed thereto only at the center O.

The electric device to be attached to the holding plate 411R or 411L is not limited to the control circuit 6 or the relay circuit 7, but may be a circuit that operates independently of the charge and discharge of the stack 5.

Thus, it is preferable to appropriately select the fixing position out of the through holes 415a to 415d arranged as above. Here, just one of the through holes 415a to 415d may be adopted as the fixing position.

[Configuration of Management Circuit (Electric Device)]

Hereunder, description will be given on a configuration of the control circuit 6 and the relay circuit 7 constituting the management circuit (electric device) that controls the power source main body 4.

Referring again to the exploded perspective view in FIG. 21, the configuration of the control circuit 6 will be described in further details.

As shown in FIG. 21, the control circuit 6 includes the base 620 made of a synthetic resin (insulative material), and the circuit board 630 having the circuit element 631 mounted thereon, the circuit board 630 being attached to the base 620. In addition, walls 622a, 622b, and 622c are formed so as to project upright from a main surface 621 of the base 620, along the periphery of the circuit board 630. The walls 622a and 622c are orthogonal to the front face of the stack 5, and the walls 622b and 622d are parallel to the front face of the stack 5. The walls 622a to 622d are formed of an insulative material, and located along the lateral side of parts constituting the control circuit 6, which is the electric device.

Further, plate-shaped joint members 610, 640, and 650 made of a conductive metal such as copper, aluminum, an alloy thereof, or the like are provided at the upper end portion of the base 620, for connection to the battery module 470 which is the battery main body of the power source unit 1. The joint member 610 connected to the negative electrode terminal 511b of the battery module 470 via the through hole 610a is connected to the joint members 640 and 650. The joint member 650 serves for connection to the negative terminal 3b of the entirety of the power source main body 4 as will be described later, and includes a fastening nut 650a fixed at the end portion thereof.

Referring to the exploded perspective view in FIG. 22, the configuration of the relay circuit 7 will be described in further details. The relay circuit 7 includes the base 720 made of a synthetic resin (insulative material), and the relay elements 730 attached to the base 720, as shown in FIG. 22. As on the control circuit 6, walls are formed so as to project upright from the surface of the base 720 along the periphery of the relay elements 730. The walls are formed of an insulative material, and located along the lateral side of the parts constituting the relay circuit 7, which is the electric device. The walls are constituted of the combination of walls 722a parallel to the front face of the stack 5, walls 722b orthogonal to the front face of the stack 5, and a wall 722c oriented in a direction diagonally intersecting the front face of the stack 5.

Each of the relay elements 730 includes plate-shaped joint members 710 and 711 of the same material as that of the joint member 610, for connection to the battery module 470. The joint member 710 is connected to the positive electrode terminal 511a of the battery module 470 via the through hole 710a. The joint member 711 serves for connection to the positive terminal 3a of the entirety of the power source main body 4, and includes a fastening nut 711a fixed at the end portion thereof.

A feature of this embodiment configured as above is that the walls are provided along the periphery of the circuit board and the relay elements.

The explanation of the above will be given hereunder focusing on the control circuit 6. As shown in FIG. 21, the control circuit 6 includes the walls 622a to 622c formed along the periphery of the circuit board 630, such as the walls 622a, 622b formed along the peripheral edge of the control circuit 6. The walls 622a to 622c are taller than the height of the parts constituting the control circuit 6. In other words, the walls 622a to 622c projecting upright from the main surface 621 are formed so as to surround the circuit board 630, and a height H from the main surface 621 is higher than a total height h1 of the circuit element 631 including the thickness of the circuit board 630. Thus, the base 620 includes a box-shaped structure constituted of the main surface 621 and the walls 622a to 622c, and the circuit board 630 is accommodated inside the box structure.

Figure 24:
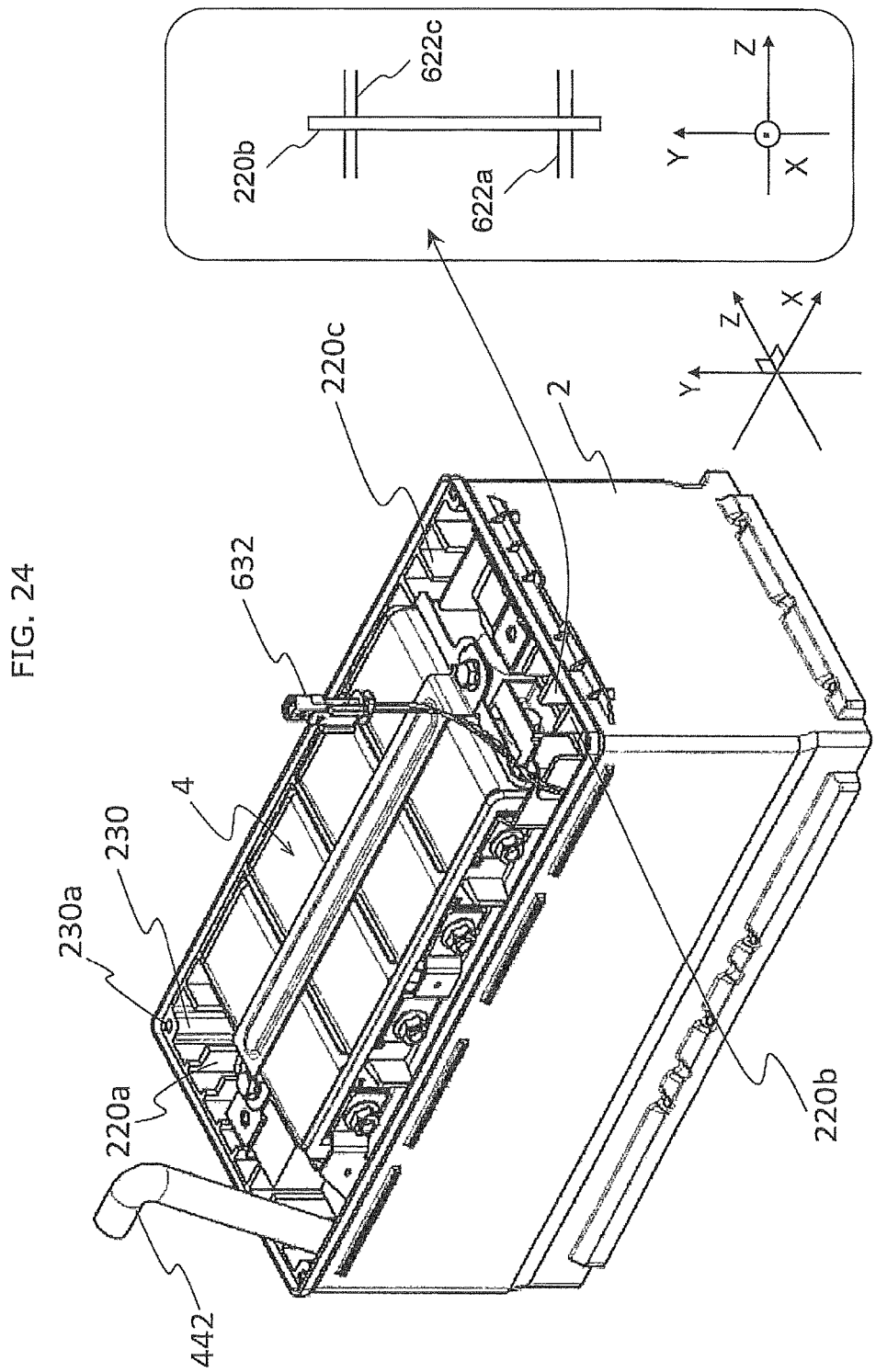
FIG. 24 is a perspective view explaining the configuration of a container body of the power source unit according to the embodiment.

Accordingly, the walls 622a to 622c serve as defense walls against intrusion of foreign matters from outside, to minimize the likelihood that the hand of the worker, a tool or a jig directly contacts the circuit board 630, for example when the control circuit 6 is attached to the battery module 470 as shown in FIG. 19, or when the power source main body 4 is introduced in the container body 2 as shown in FIG. 2 or FIG. 24, to thereby improve the yield.

Since the walls 622a to 622d are made of an insulative material, the parts such as the circuit element 631 constituting the electric device can be insulated from other components. In particular, the wall 622d serves as an insulation shield that covers the outer region of the joint members 610 and 640 through which a large current runs.

The top end portions of the walls 622a to 622d are, as shown in FIG. 24, opposed to the inner wall of the container body 2 when the power source main body 4 is placed in the container body 2. Accordingly, the walls 622a to 622d serve as buffer members that prevent the circuit element 631 from directly contacting the inner wall of the container body 2. Therefore, even when the power source main body 4 is made to vibrate or swing in the direction in which the battery cells 50 are stacked by an external force, the top end portions of the walls 622a to 622d, not the circuit element 631, first make contact with the inner wall of the container body 2, to thereby protect the circuit element 631.

Figure 25:
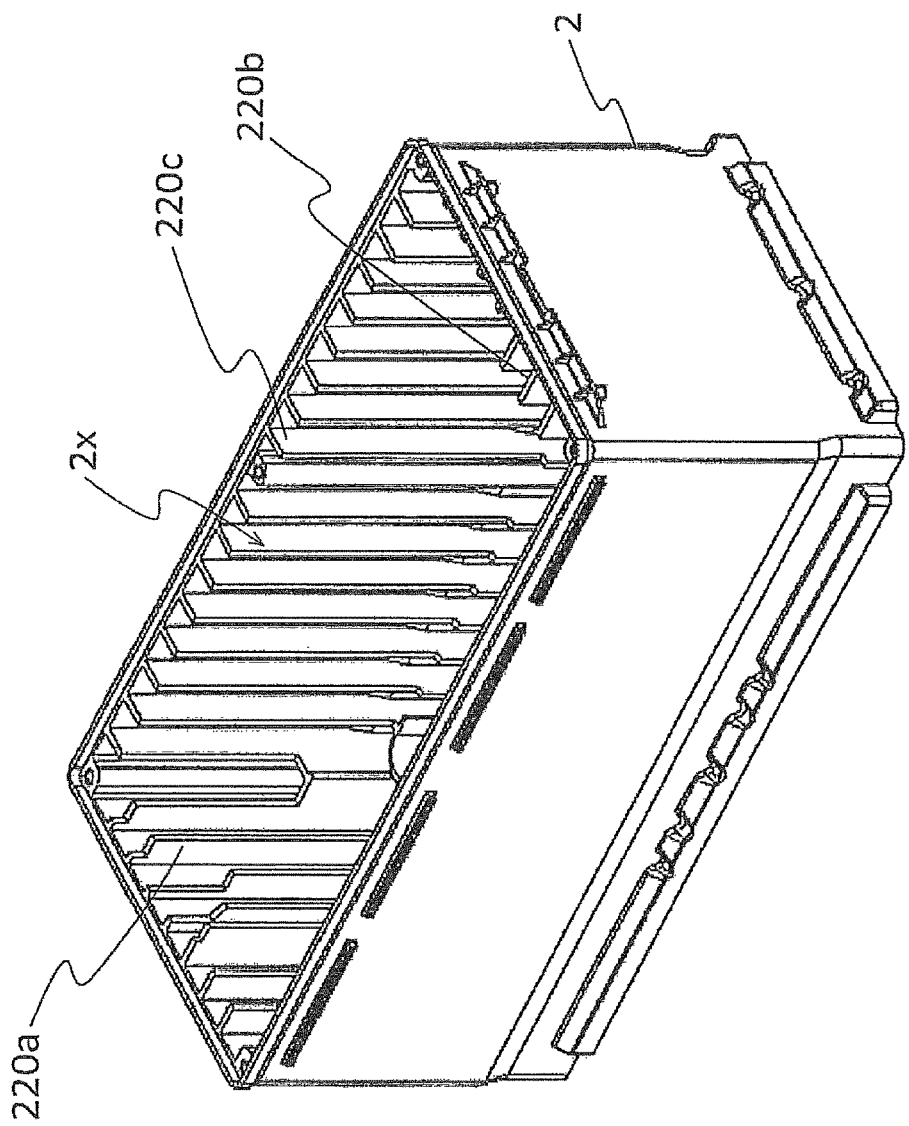
FIG. 25 is another perspective view explaining the configuration of the container body of the power source unit according to the embodiment.
Figure 26:
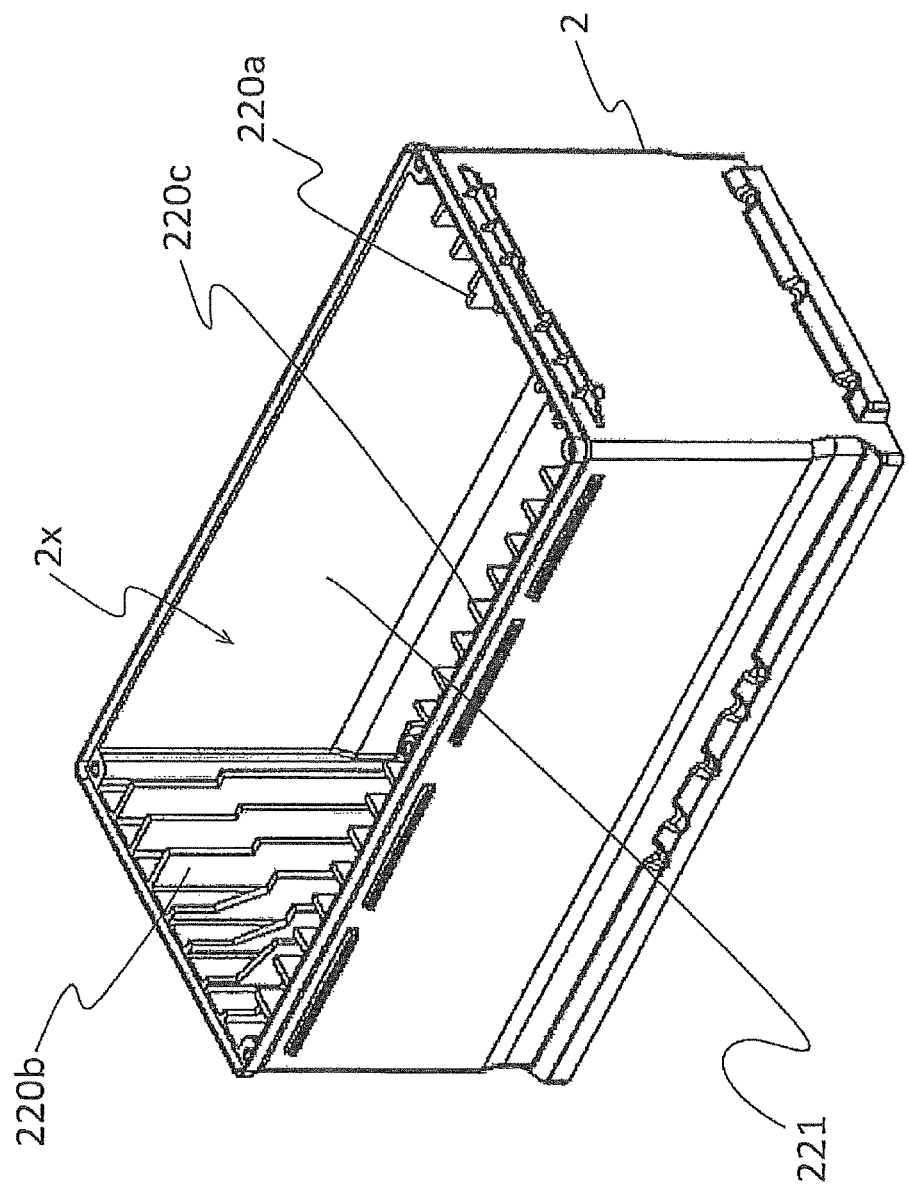
FIG. 26 is a perspective view explaining the configuration of another container body of the power source unit according to the embodiment.

Further, as shown in FIGS. 24 to 26, the container body 2 includes ribs 220a to 220c made of a synthetic resin and projecting upright from the inner wall, except for the inner wall of the bottom face, toward the center of the container, the ribs corresponding to the projecting portion. In particular, the rib 220b formed on the right-hand side wall directly opposes the control circuit 6, when the power source main body 4 is introduced in the container body 2. In other words, the container body 2 includes the ribs 220b projecting from the inner wall thereof toward the walls 622a to 622d. FIGS. 24 to 26 are perspective views explaining the configuration of the container body 2 of the power source unit 1 according to the embodiment.

The ribs 220b extend along the inner wall of the container body 2 from the opening 2x toward the bottom face, and the top end portion of the rib 220b and that of the wall 622a or 622c intersect each other when viewed in a direction in which the rib 220b and the wall 622a or 622c are opposed. More specifically, as shown in FIG. 24, the ribs 220b are oriented such that the top end portions thereof become orthogonal to the top end portion of the wall 622a or 622c when viewed in the X-axis direction. Forming thus the walls 622a, 622c and the ribs 220b so as to be orthogonal to each other causes the walls 622a, 622c and the ribs 220b to contact each other at least when the container swings, thereby further improving the shock resistance.

The top end portion of the rib 220b and that of the wall 622a or 622c may be formed so as to intersect at a predetermined angle, instead of orthogonally intersecting. In this case also, since the top end portion of the rib 220*b* and that of the wall 622*a* or 622*c* intersect with each other, the top end portion of the rib 220*b* and that of the wall 622*a* or 622*c* can be easily made to contact each other when the power source unit 1 vibrates or swings, to thereby protect the circuit element 631, a part of the electric device.

Alternatively, the top end portion of the rib 220*b* and that of the wall 622*a* or 622*c* may be oriented parallel to each other, provided that the ribs and the walls are located so as to overlap when viewed in the opposing direction. In this case also, the top end portion of the rib 220*b* and that of the wall 622*a* or 622*c* can be made to contact each other to thereby protect the circuit element 631.

The relay circuit 7 also includes, as shown in FIG. 22, the walls 722*a* to 722*c* formed along the peripheral edge of the relay circuit 7, and the walls 722*a* to 722*c* are taller than the height of the parts constituting the relay circuit 7. In other words, a height H2 of the walls constituted of the combination of the walls 722*a* to 722*c* from the main surface 721 is higher than a height h2 of the relay elements 730. In addition, the top end portions of those walls oppose the inner wall of the container body 2. The container body 2 includes the ribs 220*a* formed on the inner wall so as to project toward the walls on the relay circuit 7. Further, the top end portion of the rib 220*a* and that of the wall intersect each other when viewed in the opposing direction. Therefore, the same advantageous effects offered by the control circuit 6 can equally be attained in the relay circuit 7.

As described above, in the power source unit that includes the batteries according to this embodiment, the wall taller than the height of the parts of the electric device is provided on the lateral side of the parts, and therefore the parts can be protected by the wall. Even if the electric device is enclosed in the container for protection, the electric device may be damaged when the container is deformed. Even in such a case, the wall serves to protect the electric device. The power source unit thus configured is, therefore, capable of protecting the management circuit or the circuits constituting the electric device, thereby improving the yield of the production and the durability in use.

In addition, the control circuit 6 and the relay circuit 7, which are the electric devices, are mounted on the holding plates located on the respective sides of the stack 5. Therefore, by simply fixing the electric devices on the respective holding plates, the electric devices can be readily mounted on the power source main body 4.

It is to be noted that the present invention is not limited to the foregoing configuration.

Although the walls 622*a* to 622*d* and the walls 722*a* to 722*c* are formed as a part of the base 620 or 720 so as to project upright from the main surface 621 or 721 according to the embodiment, the base 620 or 720 may be formed without the main surface 621 or 721, and may only include the walls. In this case, although the circuit board 630 or the relay elements 730 are disposed in direct contact with the holding plate 411R or 411L, the walls can serve to protect the circuit elements and to prevent collision with the inner wall of the container.

Although the walls 622*a* to 622*d* and the walls 722*a* to 722*c* are formed so as to surround the circuit board 630 or the relay elements 730 according to the embodiment, the walls may cover only a part of the periphery of the circuit board 630 or the relay elements 730. In this case also, the wall can effectively prevent collision with the inner wall of the container.

Although the walls 622*a* to 622*d* and the walls 722*a* to 722*c* are formed so as to project upright from the bottom face according to the embodiment, the walls may be erected at an acute or obtuse angle. In addition, the walls may be formed of a metal or any desired material, instead of a synthetic resin. However, it is preferable to employ a synthetic resin because the walls can be easily formed and be compatible as a buffer member with the ribs 220*a* and 220*b* of the container body 2, which are also made of a synthetic resin. The electric device to be attached to the holding plate 411R or 411L is not limited to the control circuit 6 or the relay circuit 7, but may be a circuit that operates independently of the charge and discharge of the stack 5.

Further, although the battery module 470 in the battery main body of the power source main body 4 is composed of a plurality of battery cells 50 according to the embodiment, the battery main body may only include one piece of battery cell 50, in which case the foregoing advantageous effects can equally be attained.

[Configuration of Container]

Hereunder, a configuration of the container that accommodates therein the power source main body 4 will be described.

Referring again to the perspective views in FIGS. 24 to 26, the configuration of the container body 2 of the container will be described in further details.

As shown in FIG. 25, the container body 2 includes the ribs 220*a* to 220*c*, which are the projecting portions formed so as to project from the inner wall of the container body 2 toward the surface of the battery module 470. The top end portions of the projecting portions are separated from the coupling member 440. In other words, the projecting portions are formed on the inner wall of the side faces of the container body 2 different from the side face opposing the coupling member 440.

Thus, the ribs 220*a* to 220*c* made of a synthetic resin are formed so as to project upright from the inner wall of the container body 2 toward the center of the container. The ribs 220*a* to 220*c* are strip-shaped members extending from the opening 2*x* of the container body 2 toward the bottom face thereof, and are formed integrally with the container body 2 by injection molding, thus to be seamlessly unified with the container body 2.

Referring now to FIG. 24, the ribs 220*a* and 220*b* are formed on the inner wall of the container body 2 opposing at least one of the holding plates 411R, 411L of the battery module frame 410. Accordingly, when the power source main body 4 is accommodated in the container body 2, the ribs 220*a* are located adjacent to the left-hand side face of the power source main body 4 and directly oppose the relay circuit 7, and the ribs 220*b* are located adjacent to the right-hand side face of the power source main body 4 and directly oppose the control circuit 6. The ribs 220*c* are located so as to directly oppose the rear face of the power source main body 4.

The ribs 220*a* to 220*c* serve as a buffer member that prevents the power source main body 4 from directly colliding the container body 2 thereby being damaged, when the power source unit 1 is subjected to vibration or impact, for example while being used as an automotive battery. The ribs 220*a* to 220*c* thus contribute to improving the shock resistance of the power source unit 1, and further to improving the versatility thereof. In addition, since the contact between the power source main body 4 and the ribs 220*a* to 220*c* is limited to the top end portion of the ribs, the impact of heat generated in the power source main body 4 can also be mitigated.

Further, a feature of the power source unit according to this embodiment is, as shown in FIGS. 24 and 26, that the ribs are not provided on the inner wall 221 opposing the front face of the power source main body 4.

Explanation of the above will be given hereunder. The front face of the power source main body 4 accommodated in the container body 2 corresponds to the top face 51 of the battery cells 50 constituting the stack 5, and the top face 51 is the portion where the electrode terminals 510 are located and hence heat is most actively generated with the operation of the power source unit 1. In addition, the power source main body 4 includes the coupling member 440 serving as the drain pipe for discharging the gas originating from decomposition of the electrolyte in the stack 5 and through which the high-temperature gas flows. The coupling member 440 is located on the front face of the power source main body 4, which also makes the front face the major source of heat.

Further, when the power source unit 1 is made to vibrate or swing the container body 2 and the cover 3 constituting the container also vibrate, and the vibration propagates to the top end portion of the ribs, thus causing the top end portion to intermittently or continuously contact the power source main body 4. Accordingly, the vibration is transmitted to the power source main body 4 and therefore the bolt joints between the respective members of the power source main body 4, especially the bolt 440a connecting the holding plates 411R, 411L of the battery module frame 410 and the coupling member 440, which are directly binding the stack 5, become prone to be loosened. Consequently, the stack 5 may fail to maintain the correct posture.

For the reason mentioned above, the ribs are excluded from the inner wall 221 of the container body 2 opposing the front face of the power source main body 4, so that the container body 2 made of a synthetic resin is prevented from being overheated and deformed. In addition, the heat from the front face of the power source main body 4 can be uniformly diffused in the gap between the inner wall 221 and the front face of the power source main body 4, which leads to improved heat dissipation efficiency.

Still further, excluding the ribs from the inner wall 221 prevents the vibration of the container from propagating to the coupling member 440 through the ribs, thereby suppressing the loosening with time of the joint between the coupling member 440 and the battery module frame 410.

As described above, since the power source unit 1 according to this embodiment includes the ribs 220a to 220c formed on the inner wall of the container body 2, the shock resistance and heat resistance can be improved, and further the power source unit obtains higher versatility.

Although the ribs 220a to 220c are formed so as to project upright from the inner wall of the container body 2 except for a part of the drawing according to the embodiment, the ribs may be erected at an acute or obtuse angle with respect to the inner wall.

According to the embodiment, further, the ribs 220a to 220c are strip-shaped members extending from the opening 2x of the container body 2 toward the bottom face thereof and, as illustrated, the width of the rib (distance between the inner wall of the container body 2 and the top end portion of the rib) is generally constant in the extending direction. Alternatively, the ribs 220a to 220c may be formed in a tapered shape in which the width becomes gradually wider from the opening 2x toward the bottom face. In this case, upon introducing the power source main body 4 in the container body 2 the bottom face of the power source main body 4 is engaged with the widened portion of the ribs, and therefore the power source main body 4 can be stably fixed in the container body 2.

It is to be noted that the present invention is not limited to the foregoing configuration.

Although the ribs are provided only in the container body 2 according to the embodiment, the ribs may also be formed on the inner wall of the cover 3.

As shown in FIG. 26 the ribs are completely excluded from the inner wall 221 opposing the front face of the power source main body 4 according to the embodiment. Alternatively, the ribs may also be formed on the inner wall 221 provided that the top end portions of the ribs are spaced from the coupling member 440. For example, the ribs may be excluded only from the region on the inner wall 221 opposing the coupling member 440 which emits highest heat, or the ribs may be formed on the inner wall 221 opposing the coupling member 440 such that a gap is secured between the top end portion of the rib and the coupling member 440. In these cases also, the shock resistance and heat resistance of the power source unit 1 can be improved.

[Configuration of Cover]

Hereunder, description will be given on a configuration of the cover 3 as part of the container that accommodates therein the power source main body 4, and of the battery module holder 460.

Figure 27:
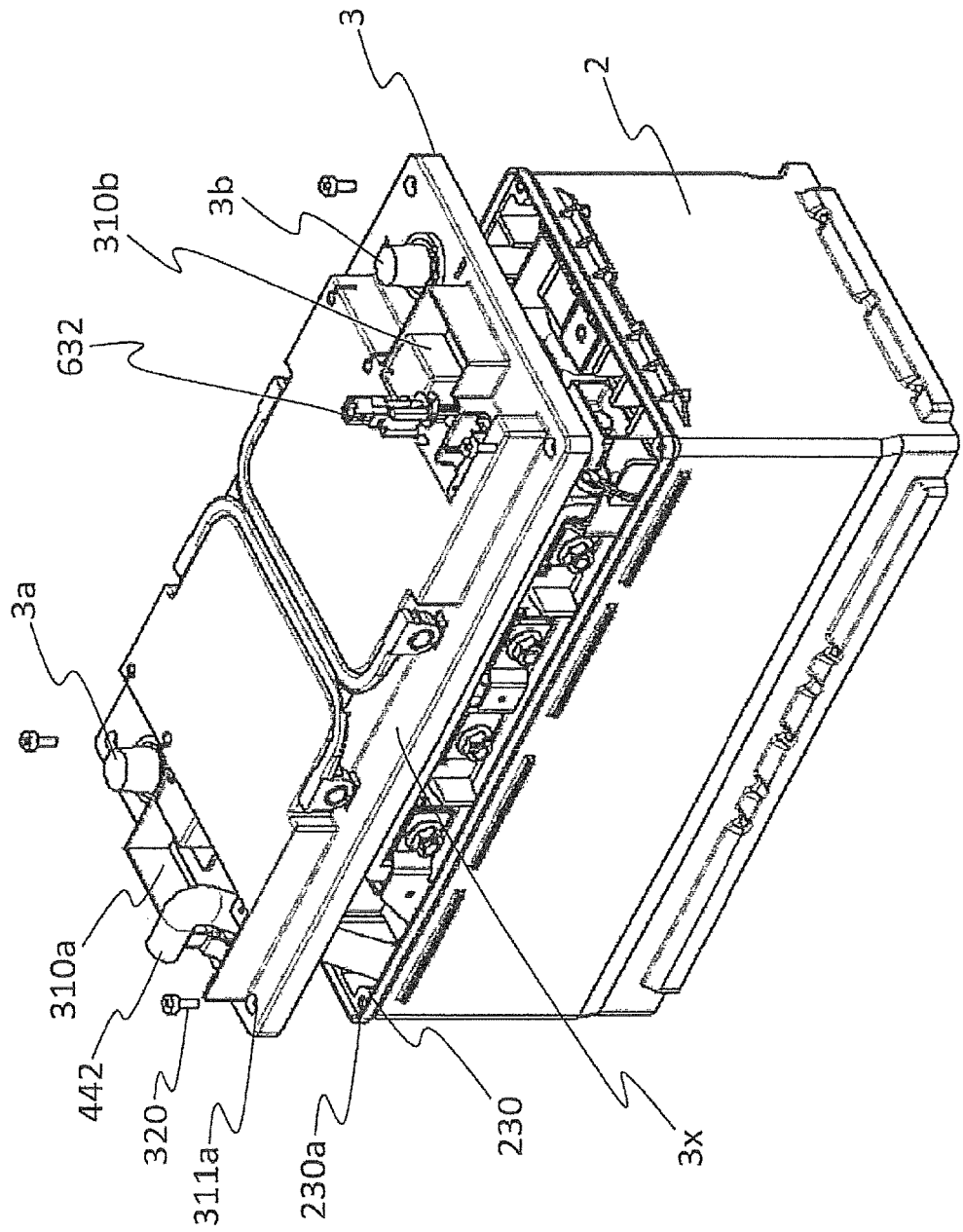
FIG. 27 is a perspective view explaining the configuration of a cover of the power source unit according to the embodiment.
Figure 28:
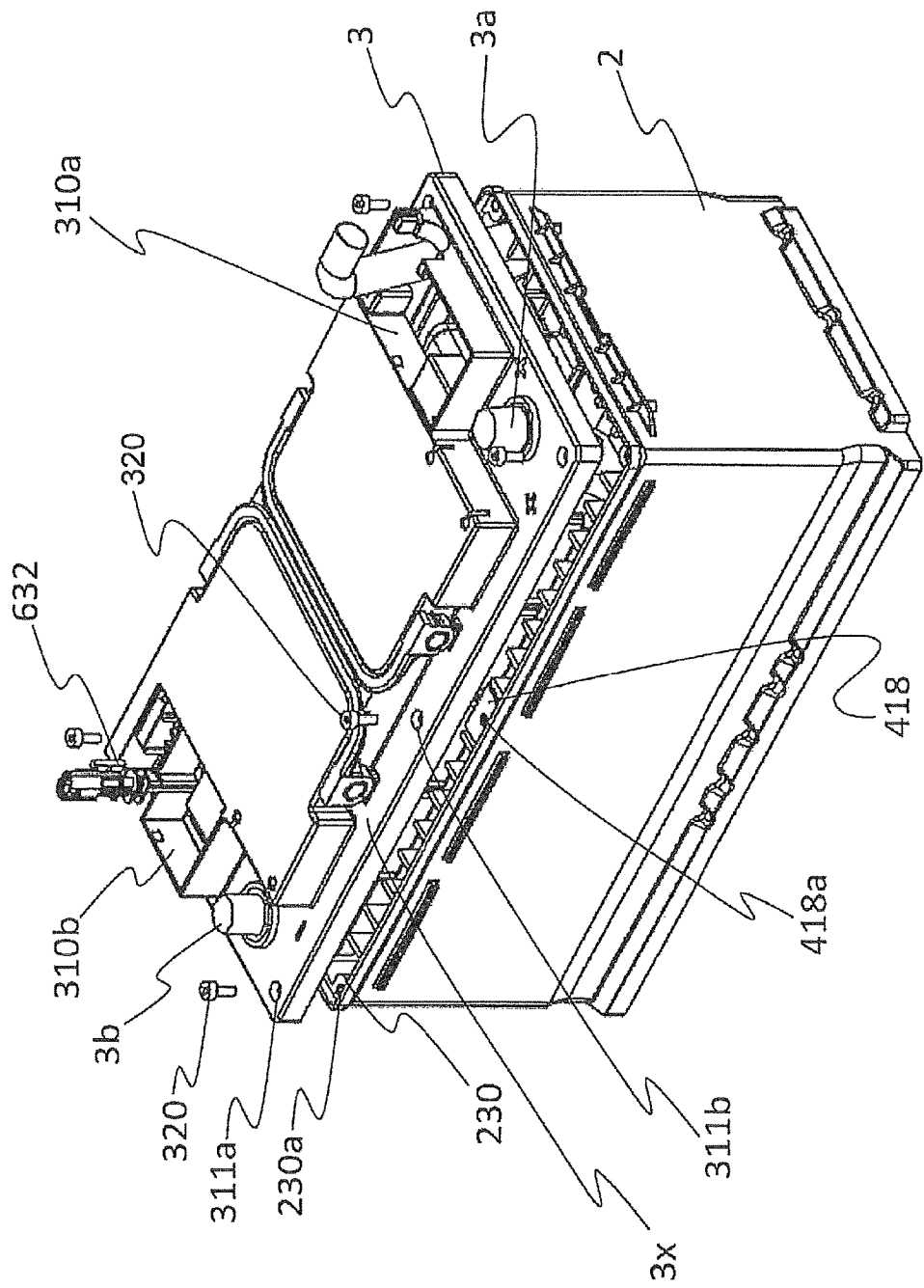
FIG. 28 is another perspective view explaining the configuration of the cover of the power source unit according to the embodiment.
Figure 29:
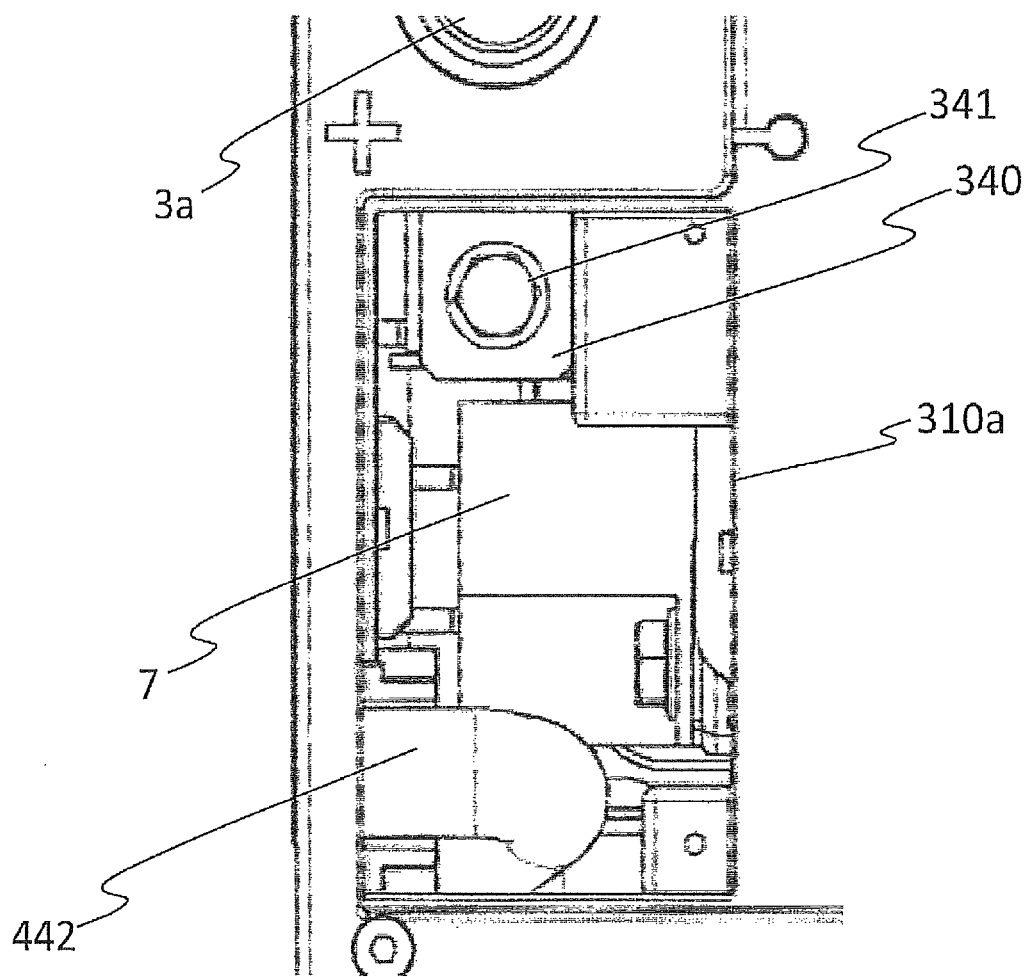
FIG. 29 is a fragmentary plan view explaining the configuration of a portion in the vicinity of a positive terminal of the power source unit according to the embodiment.
Figure 30:
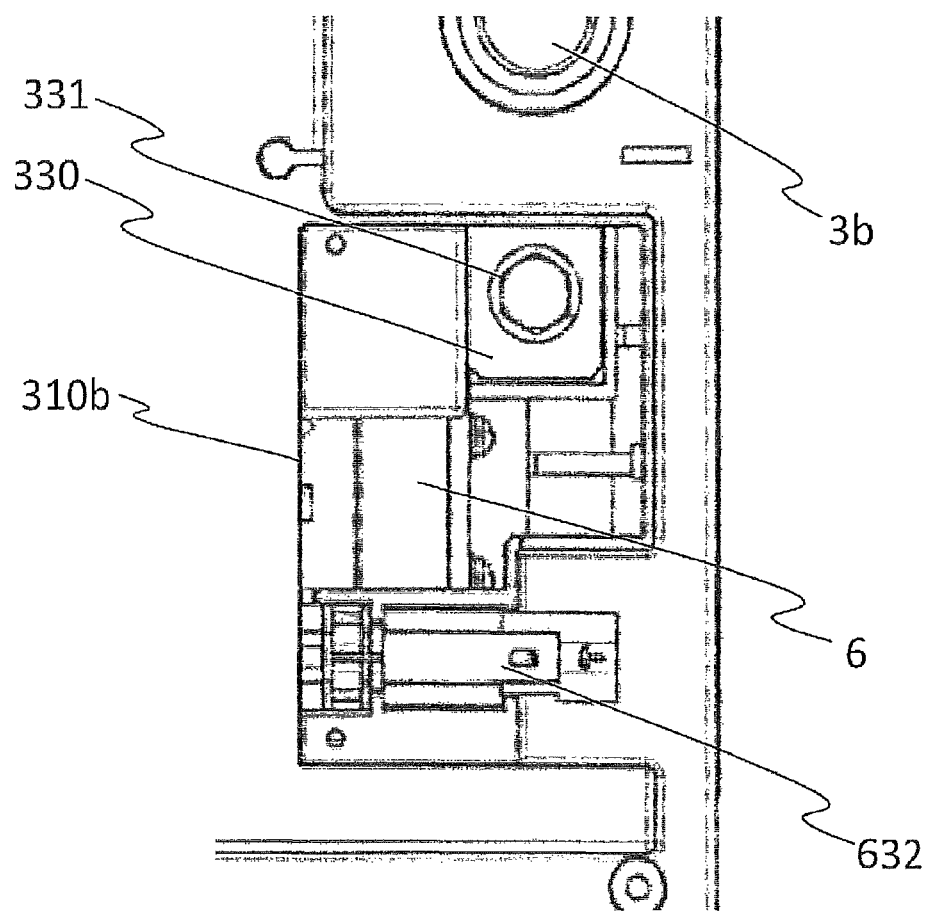
FIG. 30 is a fragmentary plan view explaining the configuration of a portion in the vicinity of a negative terminal of the power source unit according to the embodiment.
Figure 31:
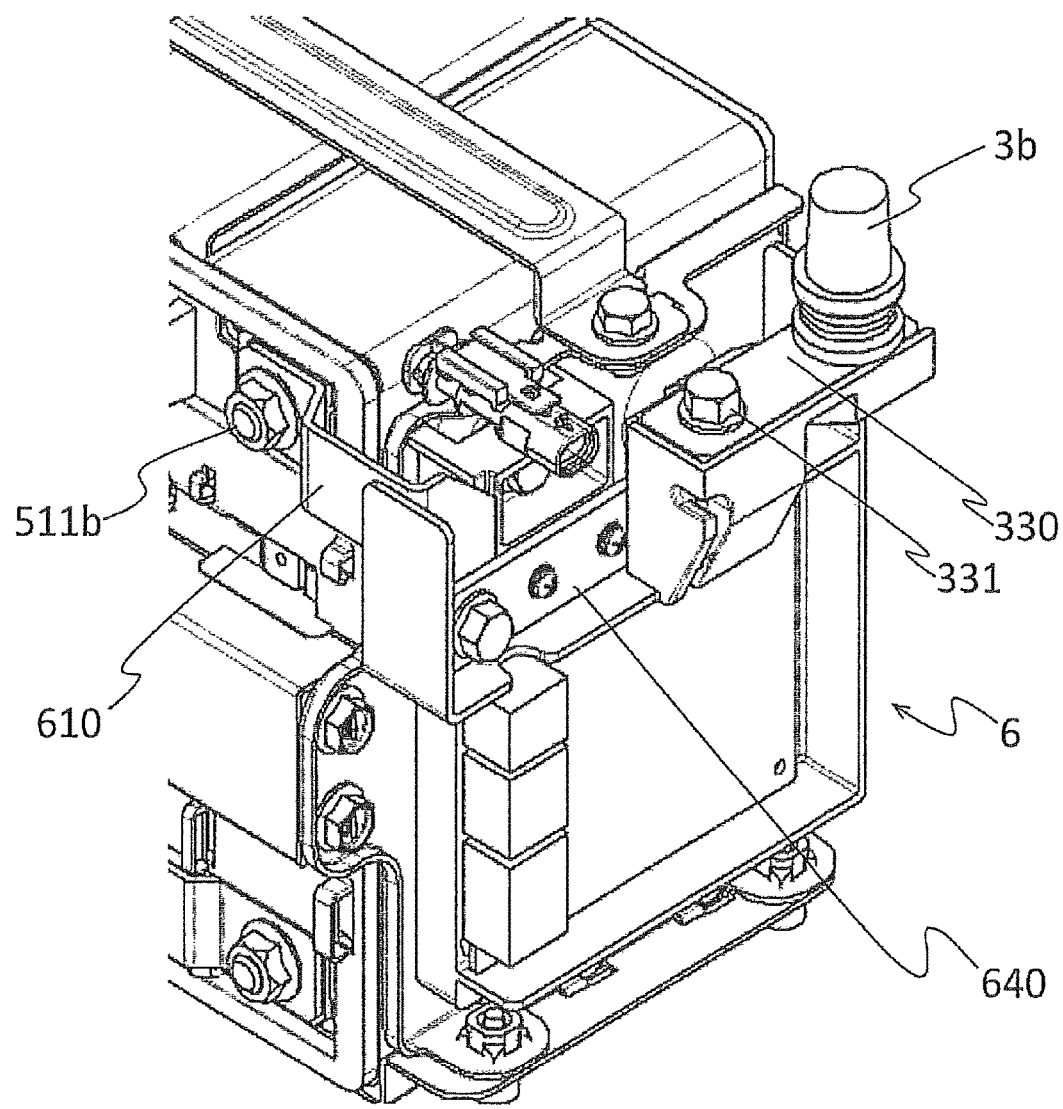
FIG. 31 is a fragmentary perspective view explaining the configuration of a portion in the vicinity of the negative terminal of the power source unit according to the embodiment.
Figure 32:
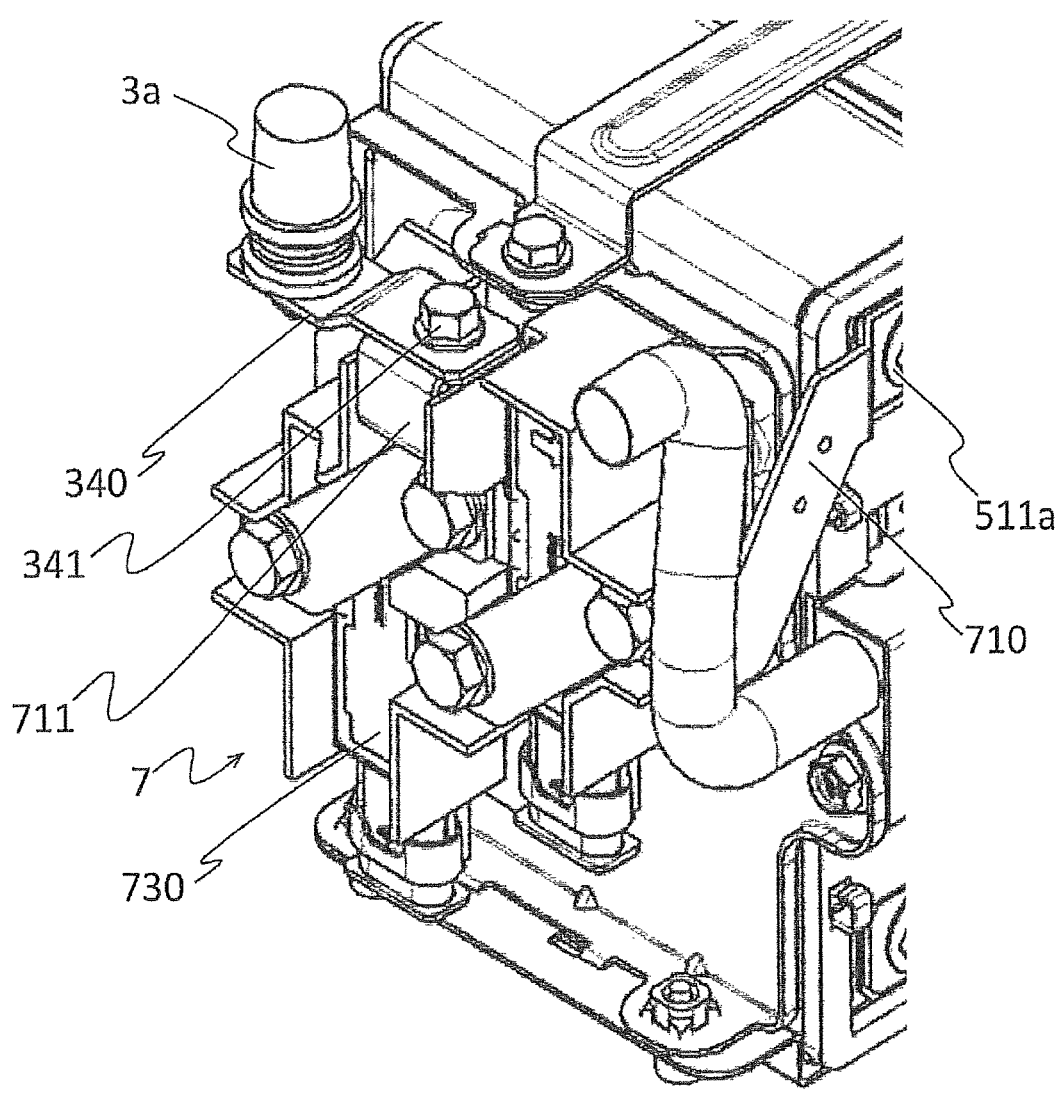
FIG. 32 is a fragmentary perspective view explaining the configuration of a portion in the vicinity of the positive terminal of the power source unit according to the embodiment.
Figure 33:
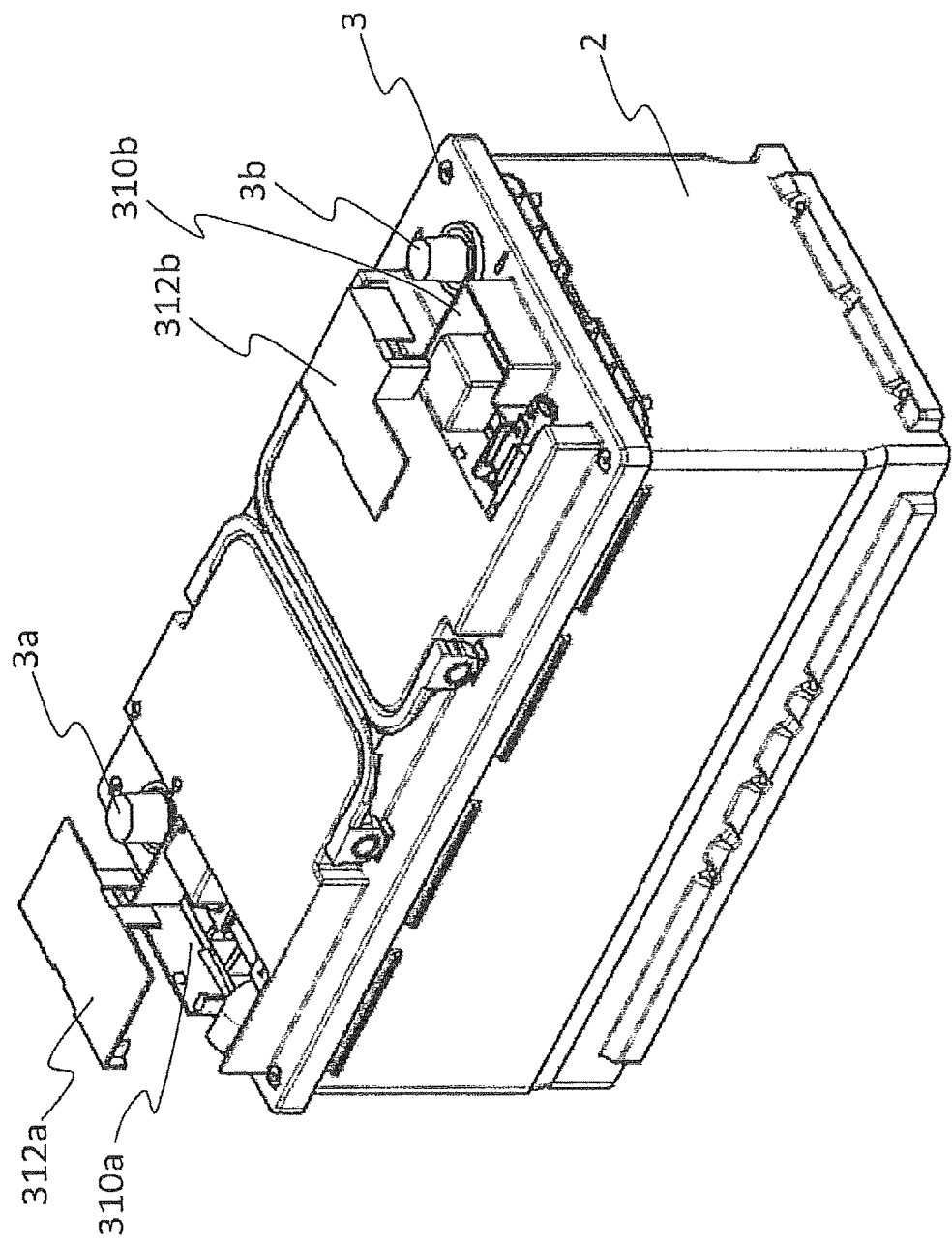
FIG. 33 is another perspective view explaining the configuration of the cover of the power source unit according to the embodiment.

FIGS. 27, 28, and FIG. 33 are perspective views explaining a configuration of the cover 3 of the power source unit 1 according to the embodiment. FIGS. 29 and 32 are fragmentary plan views explaining a configuration of a portion in the vicinity of the positive terminal 3a of the power source unit 1 according to the embodiment. FIGS. 30 and 31 are fragmentary plan views explaining a configuration of a portion in the vicinity of the negative terminal 3b of the power source unit 1 according to the embodiment.

Referring first to the perspective views in FIGS. 27 and 28, the configuration of the cover 3 of the container and the battery module holder 460 according to this embodiment will be described, parallel to the description of the assembly process of the power source unit 1.

As shown in FIG. 27, the cover 3 is placed over the container body 2 in which the power source main body 4 is accommodated, so as to close the opening 2x. The cover 3 includes through holes 311a respectively formed at four corners of the upper face 3x, at positions corresponding to threaded holes 230a respectively formed on abutments 230 at four corners of the container body 2. Upon inserting a screw 320 in each of the through holes 311a and fastening the same, the cover 3 and the container body 2 are coupled.

The cover 3 includes windows 310a, 310b formed adjacent to the positive terminal 3a and the negative terminal 3b, respectively. A harness terminal 632 connected to the control circuit 6 is drawn out through the window 310b, and the distal end portion of the drain pipe 442 extending from the coupling member 440b is drawn out through the window 310a.

In addition, the positive terminal 3a is connected to the positive electrode terminal 511a of the power source main body 4 through the window 310a, and the negative terminal 3b is connected to the negative electrode terminal 511b of the power source main body 4 through the window 310b. To be more detailed, as shown in the fragmentary plan view in FIG. 29, a connection terminal 340 provided on the inner side of the cover 3 and fixed to the positive terminal 3a is connected to the relay circuit 7 via a bolt 341 by operation performed through the window 310a, to thereby establish the electrical and mechanical connection. Likewise, as shown in FIG. 30, a connection terminal 330 provided on the inner side of the cover 3 and fixed to the negative terminal 3b is connected to the control circuit 6 via a bolt 331 by operation performed through the window 310b, to thereby establish the electrical and mechanical connection.

FIG. 31 illustrates how the negative terminal 3b is connected to the power source main body 4. The joint member 610 having an end portion fixed to the negative electrode terminal 511b is connected to the connection terminal 330 via the joint member 640 of the control circuit 6 and the joint member 650 shown in FIG. 21. Upon engaging the bolt 331 shown in FIG. 31 with the nut 650a provided on the back surface of the joint member 650 shown in FIG. 21, the connection is established between the negative electrode terminal 511b and the negative terminal 3b.

Likewise, to connect the positive terminal 3a to the power source main body 4, as shown in FIG. 32 the joint member 710 having an end portion fixed to the positive electrode terminal 511a is connected to the connection terminal 340 via the relay element 730 of the relay circuit 7. Upon engaging the bolt 341 shown in FIG. 32 with the nut 711a provided on the back surface of the joint member 710 shown in FIG. 22, the connection is established between the positive electrode terminal 511a and the positive terminal 3a. Here, though excluded from FIGS. 31 and 32 for the sake of explicitness of description, actually the cover 3 is interposed between the negative terminal 3b and the connection terminal 330, and between the positive terminal 3a and the connection terminal 340, in the respective drawings.

Then the cover 3 is connected to the power source main body 4. As shown in FIG. 28, a through hole 311b is provided on the upper face 3x of the cover 3 at a position close to the rear face of the container. The through hole 311b corresponds to the through hole 418a formed in the tab 418 of the power source main body 4, upon fitting the cover 3 to the container body 2.

Upon inserting the screw 320 in the through hole 311b and the through hole 418a and fastening the same with a nut, the cover 3 and the power source main body 4 are coupled. The tab 418 is formed at the center of the upper beam member 417a of the first beam member 417 of the battery module frame 410 as shown in FIG. 6, and though not illustrated a nut concentric with the through hole 418a is fixed on the back of the tab 418, which enables the screw 320 to be fastened.

Further, the screw 211 is inserted through the through hole 210 in the bottom face of the container body 2 shown in FIG. 2, to fix the power source main body 4 and the container body 2.

Finally, lids 312a and 312b are respectively fitted in the windows 310a and 310b as shown in FIG. 33, thus to complete the assembly of the power source unit 1.

A feature of the configuration according to this embodiment is that the battery module holder 460 is employed, with which the power source main body 4 accommodated in the container is fixed to both the cover 3 and the container body 2.

As shown in FIGS. 6 and 7, the battery module holder 460 includes the tab 418 with the through hole 418a for connection with the cover 3 and the tab 423 with the through hole 422 for connection with the container body 2, and these tabs enable the power source main body 4 to be fixed to both the cover 3 and the container body 2.

Such a configuration allows the power source main body 4 to be stably fixed inside the container, thereby contributing to improve the reliability of the power source unit.

In addition, the power source main body 4 can be fixed inside the container without the need to additionally employ the parts to connect the battery module holder and the container as in the conventional products. This leads to reduction in number of parts, as well as in number of steps in the manufacturing process, thus to achieve higher production efficiency.

Further, as shown in FIGS. 2 and 28, the power source main body 4 is fixed from outside of the container by using the screws in this embodiment. Such an arrangement facilitates the coupling and separation of the container and the power source main body 4, thereby improving the production efficiency and facilitating the maintenance work.

In particular, since the top faces of the battery cells 50, on which the electrode terminals 510 are provided, are oriented as the front face of the power source main body 4, the top face and the bottom face of the power source main body 4 itself correspond to the symmetrical side faces 52 of the battery cell 50, and accordingly the tabs 414 and 423 are also located at vertically symmetrical positions with respect to the power source main body 4. Therefore, after completing the assembly of the power source main body 4, the coupling of the power source main body 4 and the container body 2 shown in FIG. 2, and the coupling of the power source main body 4 and the cover 3 shown in FIG. 28, may be performed in random order. Accordingly, the work efficiency in the assembly of the power source unit 1 can be further improved.

It is to be noted that the present invention is not limited to the foregoing configuration. For example, the cover 3 is fixed to the power source main body 4 via the first beam member 417, and the container body 2 is fixed to the power source main body 4 via the second beam member 420, according to the embodiment. Alternatively, the power source main body 4 may be oriented upside down in the container, and therefore the battery module 470 in the power source main body 4 may be fixed to the container body 2 via the first beam member 417 and to the cover 3 via the second beam member 420. Thus, it suffices that the power source unit 1 is configured so as to fix the battery module 470 via the top face and the bottom face thereof to the container, and the power source unit 1 is not limited by the specific details of the configuration of the battery module.

Although the cover 3 is connected to the battery module frame 410 via the tab 418 of the first beam member 417 according to the embodiment, another through hole may be formed on respective tabs 414 of the holding plates 411R, 411L, to fix the cover 3 by using the tabs 414.

As described above, the power source unit 1 according to this embodiment, including a part or whole of the battery module holder 460, the harness tray 450, the coupling member 440, the cover 3, and the container body 2, provides improved production efficiency.

Further, the power source unit 1 according to this embodiment, including a part or whole of the management unit composed of the control circuit 6 and the relay circuit 7, the container composed of the cover 3 and the container body 2, provides improved durability and versatility.

It is to be noted that the present invention is not limited to the foregoing embodiment.

According to the embodiment, the battery module 470 is formed, as shown in FIG. 9, by placing the stack 5 on the inner wall of the battery module holder 460 such that the top faces 51 of the battery cells 50, on which the electrode terminals 510 are provided, are exposed on the side face of the battery module 470. Alternatively, the battery module 470 may be formed such that the top faces 51 of the battery cells 50 are oriented as the top face of the battery module 470. In this case, although an additional drain pipe for discharging the decomposition gas to outside is required apart from the coupling member 440, the structure of the coupling member 440 can be simplified.

According to the embodiment, the power source main body 4 is accommodated in the container body 2 as shown in FIG. 2, with the top faces 51 of the battery cells 50, on which the electrode terminals 510 are provided, oriented as the front face of the power source main body 4. Alternatively, the power source unit 1 may be configured such that the top faces 51 of the battery cells 50 are oriented as the top face of the power source main body 4. Thus, power source unit 1 is not limited by the posture of the battery module 470 in the container.

According to the embodiment, the connection between the stack 5 and the control circuit 6 or the relay circuit 7, and the connection between the control circuit 6 or the relay circuit 7 and the positive terminal 3a or the negative terminal 3b of the cover 3 are realized by fastening the plate-shaped joint member with the bolts. Alternatively, any desired technique may be employed for connection of the mentioned parts, for example welding, soldering, bonding with a conductive adhesive, and so forth. In addition, a flexible wire may be employed in place of the joint member.

Likewise, although the second beam member 420 and the third beam member 430 are connected with the bolts to the battery module frame 410 to assemble the battery module holder 460, any desired technique may be employed for connection of the mentioned parts, for example fitting the parts together, pressure-bonding, and so forth.

Although the battery cell 50 is assumed to be a non-aqueous electrolyte secondary battery typically exemplified by a lithium ion secondary battery in the embodiment, different types of secondary battery may be employed, for example a nickel-hydrogen battery, provided that the charge and discharge can be electrochemically performed. Alternatively, the battery cell 50 may be a primary battery. Further, the battery cell 50 may be of a type that directly stores electricity as electric charge, such as an electric double-layer capacitor. Thus, the battery cell 50 is a collective denomination that broadly represents elements capable of storing energy, and not limited by specific names or charging methods.

Further, although the container has a hexahedral outer shape according to the embodiment, the container may have different shapes such as a cylindrical shape. Although the cover 3 and the container body 2 are made of the same synthetic resin according to the embodiment, different materials may be employed for each of the cover and the body. In addition, the cover 3 or the container body 2 may be formed of a different material such as a metal.

Further, although the battery cells 50 constituting the stack 5 are formed of a metal in a hexahedra outer shape according to the embodiment, the battery cells 50 may have a cylindrical shape. Although the stack 5 stack 5 is composed of four battery cells 50 aligned in a single row, the stack may be formed in any desired number of rows in both vertical and horizontal directions.

Still further, although the embodiment cites the power source unit 1 as a single type that includes all of the power source main body 4, the battery module 470, the battery module frames 410 and 460, the harness tray 450, the coupling member 440, the container, the control circuit 6 and the relay circuit 7, the present invention may be realized as a unit that includes a part of the foregoing configuration.

Thus, it is to be understood that modifications and variations of the foregoing embodiment made within the scope of the present invention are duly included in the present invention.

Although only an exemplary embodiment of the present invention has been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The present invention provides the advantage of improving the durability of the power source unit, and is usefully applicable to, for example, a power source unit that includes one or more secondary batteries.

The invention claimed is:
1. A power source unit, comprising:
   a battery main body including at least one battery cell, the battery main body comprising a battery main body side surface;
   a holding plate disposed on the battery main body side surface;
   an electric device abutting a surface of the holding plate that opposes another surface of the holding plate that abuts the battery main body side surface;
   a container including a bottom face and a side face extending from the bottom face, the container enclosing the battery main body and the electric device such that at least parts of the electric device are located in a space defined between the battery main body and an inner wall of the side face; and
   a wall extending in a direction that intersects with an extending direction of the inner wall, the wall extending from a surface on which the parts are disposed, the wall being located along a lateral side of the parts, and the wall being taller than a height of the parts,
   wherein the battery main body side surface, on which the holding plate is placed, is different from another surface of the battery main body on which a terminal of the battery cell is exposed.
2. The power source unit according to claim 1, wherein the wall is provided along a peripheral edge of the electric device.
3. The power source unit according to claim 1, wherein the wall comprises an insulative material.
4. The power source unit according to claim 1, wherein a top end portion of the wall is opposed to the inner wall of the container.
5. The power source unit according to claim 4, wherein the container further includes a rib formed on the inner wall of the container, the rib extending while being opposed to the wall.
6. The power source unit according to claim 5, wherein a top end portion of the rib intersects with the top end portion of the wall, when viewed in a direction in which the rib and the wall are opposed.
7. The power source unit according to claim 4, wherein a gap is defined between the top end portion of the wall and the inner wall.
8. The power source unit according to claim 1, wherein the container comprises a synthetic resin.
9. The power source unit according to claim 1, wherein the battery main body includes:
   a stack including a plurality of the battery cells aligned, and wherein the holding plate comprises a pair of holding plates respectively provided on side faces of the stack for holding the stack.

10. The power source unit according to claim 1, wherein a gap is defined between the inner wall and a top end portion of the wall that is located on an opposing side of the wall from where the wall extends from the surface on which the parts are disposed.

11. The power source unit according to claim 1, wherein the container further includes a rib disposed on the inner wall of the container, a top end portion of the wall, which is located on an opposing side of the wall from where the wall extends from the surface on which the parts are disposed, is configured to contact the rib.

12. The power source unit according to claim 11, wherein the container further includes another side face extending from the bottom face, said another side surface of the container, which opposes a front face of the battery main body, being excluded from the rib.

13. The power source unit according to claim 1, wherein the wall comprises:
   a first wall extending from the surface on which the parts are disposed toward the side face of the container; and
   a second wall extending from the surface on which the parts are disposed toward the side face of the container, the second wall intersecting with the first wall, and
   wherein the first wall and the second wall surround the electric device around the surface on which the parts are disposed.

14. The power source unit according to claim 13, wherein, in a direction of an extension of the wall, a height of the first wall and a height of the second wall is more than the height of the parts.

15. The power source unit according to claim 1, wherein, in a direction perpendicular to the bottom face of the container, a height of the side face of the container is more than a height of the battery main body side surface.

16. A power source unit, comprising:
   a battery main body including at least one battery cell, the battery main body comprising a battery main body side surface;
   a holding plate disposed on the battery main body side surface;
   an electric device abutting a surface of the holding plate that opposes another surface of the holding plate that abuts the battery main body side surface;
   a container including a bottom surface and a side surface extending from the bottom surface, the container enclosing the battery main body and the electric device such that at least parts of the electric device are located in a space defined between the battery main body and the side surface of the container; and
   a base attached to the battery main body, the base comprising:
      a base surface on which the parts are disposed; and
      a wall extending from the base surface toward the side surface of the container more than an extension of the parts from the base surface toward the side surface of the container,
   wherein the battery main body side surface, on which the holding plate is placed, is different from another surface of the battery main body on which a terminal of the battery cell is exposed.

17. The power source unit according to claim 16, wherein a gap is defined between the side surface of the container and a top end portion of the wall that is located on an opposing side of the wall from where the wall extends from the base surface.

18. The power source unit according to claim 16, wherein the container further includes a rib disposed on the side surface of the container, a top end portion of the wall, which is located on an opposing side of the wall from where the wall extends from the base surface, is configured to contact the rib.

19. The power source unit according to claim 18, wherein a gap is defined between the top end portion of the wall and the side surface of the container.

20. The power source unit according to claim 16, wherein the wall comprises:
   a first wall extending from the base surface toward the side surface of the container; and
   a second wall extending from the base surface toward the side surface of the container, the second wall intersecting with the first wall, and
   wherein the first wall and the second wall surround the electric device on the base around the base surface.

21. The power source unit according to claim 20, wherein, in a direction of an extension of the wall from the base surface toward the side surface of the container, a height of the first wall and a height of the second wall is more than a height of the parts.

22. The power source unit according to claim 16, wherein, in a direction perpendicular to the bottom surface of the container, a height of the side surface of the container is more than a height of the battery main body side surface.

* * * * *